US011355750B2

(12) United States Patent
Teran et al.

(10) Patent No.: US 11,355,750 B2
(45) Date of Patent: *Jun. 7, 2022

(54) COMPLIANT SOLID-STATE IONICALLY CONDUCTIVE COMPOSITE MATERIALS AND METHOD FOR MAKING SAME

(71) Applicant: Blue Current, Inc., Hayward, CA (US)

(72) Inventors: Alexander Teran, Oakland, CA (US); Joanna Burdynska, Berkeley, CA (US); Benjamin Rupert, Berkeley, CA (US); Eduard Nasybulin, Fremont, CA (US); Saranya Venugopal, Emeryville, CA (US); Simmi Kaur Uppal, Oakland, CA (US)

(73) Assignee: Blue Current, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/946,974

(22) Filed: Jul. 14, 2020

(65) Prior Publication Data

US 2021/0005889 A1   Jan. 7, 2021

Related U.S. Application Data

(63) Continuation of application No. 15/607,323, filed on May 26, 2017, now Pat. No. 10,797,314.

(Continued)

(51) Int. Cl.
*H01M 4/40* (2006.01)
*H01M 4/134* (2010.01)
(Continued)

(52) U.S. Cl.
CPC ............. *H01M 4/405* (2013.01); *C03C 3/321* (2013.01); *C03C 4/14* (2013.01); *C03C 8/14* (2013.01);
(Continued)

(58) Field of Classification Search
CPC .... H01M 4/405; H01M 10/056; H01M 4/134; H01M 4/362; H01M 10/0525; H01M 10/0562
See application file for complete search history.

(56) References Cited

U.S. PATENT DOCUMENTS

| 4,828,945 A | 5/1989 | Nagata et al. |
| 4,879,073 A | 11/1989 | Kromrey |

(Continued)

FOREIGN PATENT DOCUMENTS

| CN | 101983444 A | 3/2011 |
| CN | 104779415 A | 7/2015 |

(Continued)

OTHER PUBLICATIONS

Dey, A., et al., "Micro-Structural Effect on Hydroxy Terminated Poly Butadiene (HTPB) Prepolymer and HTPB Based Composite Propellant," Molecular Nanotechnology & Nanomedicine, vol. 1, Issue 1, 2017, pp. 1-7.

(Continued)

*Primary Examiner* — Stewart A Fraser
(74) *Attorney, Agent, or Firm* — Weaver Austin Villeneuve & Sampson LLP

(57) ABSTRACT

Provided herein are ionically conductive solid-state compositions that include ionically conductive inorganic particles in a matrix of an organic material. The resulting composite material has high ionic conductivity and mechanical properties that facilitate processing. In particular embodiments, the ionically conductive solid-state compositions are compliant and may be cast as films. In some embodiments of the present invention, solid-state electrolytes including the ionically conductive solid-state compositions are provided. In some embodiments of the present invention, electrodes including the ionically conductive solid-state compositions are provided. The present invention further includes (Continued)

embodiments that are directed to methods of manufacturing the ionically conductive solid-state compositions and batteries incorporating the ionically conductive solid-state compositions.

20 Claims, 10 Drawing Sheets

Related U.S. Application Data

(60) Provisional application No. 62/470,801, filed on Mar. 13, 2017, provisional application No. 62/446,253, filed on Jan. 13, 2017, provisional application No. 62/425,911, filed on Nov. 23, 2016, provisional application No. 62/368,403, filed on Jul. 29, 2016.

(51) Int. Cl.
| | |
|---|---|
| H01M 4/36 | (2006.01) |
| C08J 3/20 | (2006.01) |
| C03C 8/14 | (2006.01) |
| H01M 10/052 | (2010.01) |
| C03C 3/32 | (2006.01) |
| C03C 4/14 | (2006.01) |
| C08L 83/04 | (2006.01) |
| H01M 4/86 | (2006.01) |
| C08J 5/18 | (2006.01) |
| C08L 9/00 | (2006.01) |
| C08L 83/06 | (2006.01) |
| C08L 83/08 | (2006.01) |
| H01M 6/18 | (2006.01) |
| H01M 10/056 | (2010.01) |
| H01M 10/0525 | (2010.01) |
| H01M 10/0562 | (2010.01) |
| C08K 3/40 | (2006.01) |

(52) U.S. Cl.
CPC ............... *C08J 3/203* (2013.01); *C08J 5/18* (2013.01); *C08L 9/00* (2013.01); *C08L 83/04* (2013.01); *C08L 83/06* (2013.01); *C08L 83/08* (2013.01); *H01M 4/134* (2013.01); *H01M 4/362* (2013.01); *H01M 4/8652* (2013.01); *H01M 6/181* (2013.01); *H01M 10/052* (2013.01); *H01M 10/056* (2013.01); *H01M 10/0525* (2013.01); *H01M 10/0562* (2013.01); *C03C 2204/00* (2013.01); *C08J 2309/00* (2013.01); *C08J 2383/04* (2013.01); *C08J 2383/06* (2013.01); *C08J 2383/08* (2013.01); *C08J 2425/08* (2013.01); *C08J 2453/02* (2013.01); *C08J 2483/04* (2013.01); *C08J 2483/08* (2013.01); *C08K 3/40* (2013.01); *C08L 2203/20* (2013.01); *C08L 2205/025* (2013.01); *H01M 2300/0068* (2013.01); *H01M 2300/0082* (2013.01); *H01M 2300/0091* (2013.01)

(56) References Cited

U.S. PATENT DOCUMENTS

| | | | |
|---|---|---|---|
| 4,929,388 A | 5/1990 | Wessling | |
| 4,985,317 A | 1/1991 | Adachi et al. | |
| 4,990,413 A | 2/1991 | Lee et al. | |
| 5,057,573 A | 10/1991 | Pascault | |
| 5,190,695 A | 3/1993 | Sotomura | |
| 5,217,827 A | 6/1993 | Fauteux | |
| 5,360,686 A | 11/1994 | Peled et al. | |
| 5,521,026 A | 5/1996 | Brochu et al. | |
| 5,529,707 A | 6/1996 | Kejha | |
| H1576 H | 8/1996 | Walker, Jr. et al. | |
| 5,576,115 A | 11/1996 | Capuano et al. | |
| 5,599,355 A | 2/1997 | Nagasubramanian et al. | |
| 5,625,474 A | 4/1997 | Aomori et al. | |
| 5,631,103 A | 5/1997 | Eschbach et al. | |
| 5,695,873 A | 5/1997 | Kumar et al. | |
| 5,965,299 A | 10/1999 | Khan et al. | |
| 6,066,417 A | 5/2000 | Cho et al. | |
| 6,096,234 A | 8/2000 | Nakanishi et al. | |
| 6,190,806 B1 | 2/2001 | Kumar et al. | |
| 6,200,707 B1 | 3/2001 | Takada et al. | |
| 6,368,746 B1 | 4/2002 | Takada et al. | |
| 6,395,429 B1 | 5/2002 | Kang et al. | |
| 6,475,677 B1 | 11/2002 | Inda et al. | |
| 6,524,749 B1 | 2/2003 | Kaneda et al. | |
| 6,645,675 B1 | 11/2003 | Munshi | |
| 6,664,006 B1 | 12/2003 | Munshi | |
| 6,939,383 B2 | 9/2005 | Eastin et al. | |
| 7,799,467 B2 | 9/2010 | DeLongchamp et al. | |
| 8,182,943 B2 | 5/2012 | Visco et al. | |
| 8,895,194 B2 | 11/2014 | Shigeo et al. | |
| 8,951,678 B2 | 2/2015 | Jeong et al. | |
| 8,968,928 B2 | 3/2015 | Wang et al. | |
| 9,093,722 B2 | 7/2015 | Zhang et al. | |
| 9,153,840 B2 | 10/2015 | Saimen et al. | |
| 9,231,253 B2 | 1/2016 | Lee et al. | |
| 9,926,411 B1 | 3/2018 | Burdynska et al. | |
| 9,972,838 B2 * | 5/2018 | Teran .................. | H01M 4/405 |
| 9,972,863 B2 | 5/2018 | Teran et al. | |
| 10,079,404 B1 | 9/2018 | Burdynska et al. | |
| 10,174,173 B2 | 1/2019 | Burdynska et al. | |
| 10,457,781 B2 | 10/2019 | Burdynska et al. | |
| 10,797,314 B2 | 10/2020 | Teran et al. | |
| 2002/0185627 A1 | 12/2002 | Chen-Yang et al. | |
| 2006/0228608 A1 | 10/2006 | Chung et al. | |
| 2008/0138697 A1 | 6/2008 | Asada | |
| 2008/0166636 A1 | 7/2008 | Niitani et al. | |
| 2008/0268346 A1 | 10/2008 | Inda | |
| 2009/0062434 A1 * | 3/2009 | Chen .................. | C08L 15/00 |
| | | | 524/59 |
| 2009/0081553 A1 | 3/2009 | Kondo et al. | |
| 2010/0055301 A1 | 3/2010 | Naoi | |
| 2010/0151335 A1 | 6/2010 | Senga et al. | |
| 2011/0049745 A1 | 3/2011 | Katayama et al. | |
| 2011/0287305 A1 | 11/2011 | Scordilis-Kelley et al. | |
| 2012/0039824 A1 | 2/2012 | Archer et al. | |
| 2012/0177990 A1 | 7/2012 | Mitsuhashi et al. | |
| 2013/0040206 A1 | 2/2013 | Yoshida et al. | |
| 2013/0273421 A1 | 10/2013 | Matsumura et al. | |
| 2013/0289197 A1 | 10/2013 | Pavon Sierra et al. | |
| 2013/0309549 A1 | 11/2013 | Luski et al. | |
| 2014/0093785 A1 | 4/2014 | Sugiura et al. | |
| 2014/0162140 A1 | 6/2014 | Hoshiba et al. | |
| 2014/0170504 A1 | 6/2014 | Baek et al. | |
| 2014/0231706 A1 | 8/2014 | Cha et al. | |
| 2014/0234726 A1 | 8/2014 | Christensen et al. | |
| 2014/0255792 A1 | 9/2014 | Cao et al. | |
| 2015/0030933 A1 | 1/2015 | Goetzen et al. | |
| 2015/0102257 A1 | 4/2015 | Mullins et al. | |
| 2015/0147660 A1 * | 5/2015 | Fujiki .................. | H01M 4/13 |
| | | | 429/306 |
| 2015/0188187 A1 | 7/2015 | Strand et al. | |
| 2015/0255767 A1 | 9/2015 | Aetukuri et al. | |
| 2015/0288028 A1 | 10/2015 | DeSimone et al. | |
| 2015/0349377 A1 | 12/2015 | Sugiura et al. | |
| 2015/0349380 A1 | 12/2015 | Manthiram et al. | |
| 2015/0380739 A1 | 12/2015 | Watanabe et al. | |
| 2016/0013465 A1 | 1/2016 | Akiike | |
| 2016/0049690 A1 | 2/2016 | Basak et al. | |
| 2016/0099470 A1 | 4/2016 | Kwon et al. | |
| 2016/0226097 A1 | 8/2016 | Wegner et al. | |
| 2016/0293946 A1 | 10/2016 | Ritter et al. | |
| 2017/0005367 A1 | 1/2017 | Van Berkel et al. | |
| 2017/0062830 A1 | 3/2017 | Bao et al. | |
| 2017/0062873 A1 | 3/2017 | Iyer et al. | |
| 2017/0133717 A1 | 5/2017 | Makino et al. | |
| 2017/0330699 A1 | 11/2017 | Buffry et al. | |
| 2017/0352916 A1 | 12/2017 | Miyashita et al. | |
| 2018/0034048 A1 | 2/2018 | Teran et al. | |

(56) References Cited

U.S. PATENT DOCUMENTS

| | | |
|---|---|---|
| 2018/0034061 A1 | 2/2018 | Teran et al. |
| 2018/0034096 A1 | 2/2018 | Teran et al. |
| 2018/0254513 A1 | 9/2018 | Burdynska et al. |
| 2018/0254518 A1 | 9/2018 | Burdynska et al. |
| 2018/0261877 A1 | 9/2018 | Strand et al. |
| 2018/0282486 A1 | 10/2018 | Burdynska et al. |
| 2019/0081353 A1 | 3/2019 | Iwata et al. |
| 2019/0135988 A1 | 5/2019 | Burdynska et al. |
| 2019/0221879 A1 | 7/2019 | Safanama et al. |
| 2019/0288319 A1 | 9/2019 | Kim |
| 2019/0312304 A1 | 10/2019 | Uesugi et al. |
| 2019/0334150 A1 | 10/2019 | Koh et al. |
| 2020/0087155 A1 | 3/2020 | Rupert |
| 2020/0099104 A1 | 3/2020 | Watanabe et al. |
| 2020/0115505 A1 | 4/2020 | Burdynska et al. |
| 2020/0203696 A1 | 6/2020 | Minamida |
| 2020/0220202 A1 | 7/2020 | Burdynska et al. |
| 2020/0220210 A1 | 7/2020 | Makino |
| 2021/0047195 A1 | 2/2021 | Rupert |
| 2021/0050620 A1 | 2/2021 | Rupert |
| 2021/0057726 A1 | 2/2021 | Hoft et al. |
| 2021/0189105 A1 | 6/2021 | Burdynska et al. |
| 2021/0194039 A1 | 6/2021 | Burdynska et al. |
| 2021/0194047 A1 | 6/2021 | Villaluenga et al. |
| 2021/0313616 A1 | 10/2021 | Villaluenga et al. |

FOREIGN PATENT DOCUMENTS

| | | |
|---|---|---|
| CN | 107403904 A | 11/2017 |
| EP | 3 407 412 | 4/2021 |
| JP | 2010/106252 A | 5/2010 |
| JP | 2010186682 | 8/2010 |
| JP | 2013033659 | 2/2013 |
| TW | 200400281 A | 1/2004 |
| WO | WO2016/017525 A1 | 2/2016 |
| WO | WO2018/023079 | 2/2018 |
| WO | WO 2018/151161 A1 | 8/2018 |
| WO | WO-2019119779 A1 | 6/2019 |
| WO | WO 2020/252427 | 12/2020 |

OTHER PUBLICATIONS

Manjari, R., et al., "Structure-Property Relationship of HTPB-Based Propellants. II Formulation Tailoring for Better Mechanical Properties," Journal of Applied Polymer Science, vol. 48, 1993, 279-289.

Nairn, K., et al., "Polymer-Ceramic Ion-Conducting Composites," Solid State Ionics, 86-88, 1996, pp. 589-593.

Santoro, M., et al., "High-Pressure Synthesis of a Polyethylene/zeolite Nano-Composite Material," Nature Communications, Published Mar. 5, 2013, 7 pages.

Sasuga, et al., "Liquid-Liquid Transition and Radiation-Induced Polymerization of Vinyl Acetate at High Pressure," Macromolecules, 1983, vol. 16, No. 4, pp. 545-548.

Hu, Qichao, "Electrode-Electrolyte Interfaces in Solid Polymer Lithium Batteries," Submitted to Harvard School of Engineering and Applied Sciences, May 1, 2012, 131 pages.

Villaluenga, et al., "Compliant glass-polymer hybrid single ion-conducting electrolytes for lithium batteries," PNAS Early Edition, 2015, pp. 1-6.

Inada, et al., "Fabrications and properties of composite solid-state electrolytes," Solid State Ionics, vol. 158, 2003, pp. 275-280.

Inada, et al., "Silicone as a binder in composite electrolytes," Journal of Power Sources, vol. 119-121, 2003, pp. 948-950.

Skaarup, et al., "Mixed phase solid electrolytes with nonconducting polymer binder," Solid State Ionics, vol. 40/41, 1990, pp. 1021-1024.

MacFarlane, D. R., et al., "Lithium-ion conducting ceramic/polyether composites," Electrochimica Acta, vol. 43, Nos. 10-11, pp. 1333-1337, 1998.

Chilaka et al., "Solid-state poly(ethylene glycol)polyurethane/polymethylmethacrylate/rutile TiO2 nanofiber composite electrolyte-correlation between morphology and conducting properties", Electrochimica Acta, vol. 62, Feb. 1, 2012 (Feb. 1, 2012), pp. 362-371, XP055127951, ISSN: 0013-4686, DOI: 10.1016/j.electacta.2011.12.052.

Shah et al., "Polymer Nanocomposites as Solid Electrolytes: Evaluating Ion-Polymerand PolymerNanoparticle Interactions in PEG-PU/PAN Semi-IPNs and Titania Systems", Journal of Physical Chemistry C, vol. 114, No. 33, Aug. 26, 2010 (Aug. 26, 2010), pp. 14281-14289, XP055127969, ISSN: 1932-7447, DOI: 10.1021/jp105450q.

Nasef et al. "Preparation of polymer electrolyte membranes for lithium batteries by radiationinduced graft copolymerization" Solid State Ionics. 2004, vol. 171, p. 243-249; p. 243, abstract, p. 244, left col., para 1.

Office Action, in U.S. Appl. No. 15/607,323.

Notice of Allowance dated Apr. 13, 2020 issued in U.S. Appl. No. 15/607,323.

Notice of Allowance, in U.S. Appl. No. 15/607,328.

Office Action dated Aug. 25, 2017, in U.S. Appl. No. 15/607,336.

Notice of Allowance dated Jan. 4, 2018, 2018 in U.S. Appl. No. 15/607,336.

Office Action, in U.S. Appl. No. 15/662,102.

Notice of Allowance, in U.S. Appl. No. 15/662,102.

Office Action, in U.S. Appl. No. 15/662,116.

Notice of Allowance, in U.S. Appl. No. 15/662,116.

Office Action, in U.S. Appl. No. 15/936,221.

Notice of Allowance, in U.S. Appl. No. 15/936,221.

Notice of Allowance (corrected), in U.S. Appl. No. 15/936,221.

Notice of Allowance, in U.S. Appl. No. 16/240,257.

Office Action dated Feb. 16, 2021 in U.S. Appl. No. 17/129,290.

Office Action dated Oct. 15, 2020 in U.S. Appl. No. 16/241,784.

Office Action dated Jan. 13, 2021 in U.S. Appl. No. 16/814,756.

Invitation to Pay additional Fees dated Oct. 2, 2017, issued in Application No. PCT/US17/44530.

International Search Report and Written Opinion dated Dec. 12, 2017 issued in Application No. PCT/US17/44530.

International Search Report and Written Opinion dated May 15, 2018 issued in Application No. PCT/US18/20780.

International Preliminary Report on Patentability dated Sep. 12, 2019 issued in PCT/US2018/020780.

Extended European Search Report dated Feb. 25, 2020 issued in Application No. 17835391.8.

International Search Report and Written Opinion dated Mar. 24, 2020 issued in PCT/US2020/012409.

Extended European Search Report and Opinion dated Nov. 12, 2020 issued in Application No. 17835391.8.

Chinese Office Action dated Feb. 7, 2021 issued in Application No. 201880026321.5.

International Search Report and Written Opinion dated Mar. 17, 2021 issued in Application No. PCT/US2020/066180.

U.S. Appl. No. 16/814,756, filed Mar. 10, 2020, Villaluenga et al.

U.S. Appl. No. 17/129,277, filed Dec. 21, 2020, Burdynska et al.

U.S. Appl. No. 17/129,290, filed Dec. 21, 2020, Burdynska et al.

Cao, Can et al., "Recent advances in inorganic solid electrolytes for lithium batteries," Frontiers in Energy Research, Jun. 27, 2014, vol. 2, Article 25, pp. 1-10.

Chinese Office Action dated Sep. 3, 2021 issued in Application No. 201780054522.1.

CN Office Action dated Oct. 18, 2021, in CN Application No. CN201880026321.5 with English translation.

Final Office Action dated Jul. 19, 2021 in U.S. Appl. No. 16/241,784.

International Search Report and Written Opinion dated Jun. 29, 2021 issued in PCT/US2021/025663.

International Search Report and Written Opinion dated Mar. 17, 2021 issued in Application No. PCT/US2020/066189.

Knauth, P. et al., "Inorganic Solid Li Ion Conductors: An Overview", Solid State Ionics, 2009, vol. 180, pp. 911-916.

Knauth, Solid State Ionics 180 (2009) 911-916 https://www.sciencedirect.com/science/article/abs/pii/S0167273809001179.

(56) References Cited

OTHER PUBLICATIONS

Kong, S. et al., "Li6PO5Br and Li6PO5Cl: The first Lithium-Oxide-Argyrodites," Wiley-VCH Verlag GmbH & Co. KGaA, Weinheim, DOI: 10.1002/zaac.201000121, 2010, 1920-1924.

Minafra et al., J. Mater. Chem. A, 2018, vol. 6, pp. 645-651 https://pubs.rsc.org/en/content/articlelanding/2017/ta/c7ta08581h/unauth#!divAbstract.

Minafra, N. et al., "Effect of Si Substitution On the Structural and Transport Properties of Superionic Li-argyrodites" Journal of Materials Chemistry A, 2018, vol. 6, pp. 645-651.

Minami, J. Non-Cryst. Solids, vol. 95-96 (1987) 107-118 https://www.sciencedirect.com/science/article/abs/pii/S0022309387801035?via%3Dihub.

Minami, T. et al., "Recent Progress in Superionic Conducting Glasses", Journal of Non Crystalline Solids, 1987, vol. 95 &96, pp. 107-118.

Nilges and Pfitzner, Z. Kristallogr., "A Structural Differentiation of quaternary copper argyrodites: Structure-property relations of high temperature ion conductors," 2005, vol. 220, pp. 281-294 https://epub.uni-regensburg.de/11740/1/87_A%20structural%20differentiation%20of%20quaternary%20copper%20argyrodites%20Structure%20-%20property%20relations%20of%20high%20temperature%20ion%20conductors.pdf).

Office Action dated Apr. 28, 2021 in U.S. Appl. No. 17/129,277.

Office Action dated Aug. 13, 2021 in U.S. Appl. No. 16/814,756.

Ribes et al., J. Non-Cryst. Solids, vol. 38-39 (1980) 271-276 https://www.sciencedirect.com/science/article/abs/pii/0022309380904305.

Ribes, M. et al., "Sulfide Glasses: Glass Forming Region, Structure and Ionic Conduction of Glasses in Na2S—XS2 (X—Si; Ge), Na2S—P2S5 and Li2S—GeS2 Systems", Journal of NonCrystalline Solids, vol. 38 & 39, 1980, pp. 271-276.

Tatsumisago et al., J. Power Sources 2014, 270, 603-607 https://www.sciencedirect.com/science/article/abs/pii/S0378775314011057.

Tatsumisago, M. et al., "Preparation of Li3BO3—Li2SO4 Glass-ceramic Electrolytes for Alloxide Lithium Batteries", Journal of Power Sources, vol. 270, 2014, pp. 603-607.

U.S. Final Office Action dated Nov. 5, 2021 in U.S. Appl. No. 17/129,277.

U.S. Non-Final Office Action dated Apr. 28, 2021 in U.S. Appl. No. 17/129,277.

U.S. Appl. No. 17/304,645, Inventors Villaluenga et al., filed Jun. 23, 2021.

U.S. Appl. No. 17/304,646, Inventors Burdynska et al., filed Jun. 23, 2021.

Xu et al., A thermally healable polyhedral oligomeric silsesquioxane (POSS) nanocomposite based on Diels-Alder chemistry, Chem. Commun. 2013,49, 6755-6757.

Zhang et al., J. Mater. Chem. A, 2019, vol. 7, pp. 2717-2722 https://pubs.rsc.org/ko/content/articlelanding/2019/ta/c8ta10790d/unauth#!divAbstract.

Zhang, Z. et al., "Design and Synthesis of Room Temperature Stable Li-argyrodite Superionic Conductors via Cation Doping", Journal of Materials Chemistry A, 2019, vol. 7, pp. 2717-2722.

Zhao, Y. et al., "Superionic Conductivity In Lithium-rich Anti-perovskites", Journal of the American Chemical Society, 2012, vol. 134, pp. 15042-15047.

Zhou et al., "New Family of Argyrodite Thioantimonate Lithium Superionic Conductors,"J. Am. Chem. Soc., 2019, vol. 141, 28 pages https://www.osti.gov/biblio/1606830-new-family-argyrodite-thioantimonate-lithium-superionic-conductors.

English language translation for CN Application No. CN107403904A (Jun Haizu), 2017.

U.S. Non Final Office Action dated Jan. 27, 2022 in U.S. Appl. No. 16/241,784.

JP Office Action dated Feb. 1, 2022, in Application No. JP2019-547367.

U.S. Non Final office action dated Apr. 1, 2022, in U.S. Appl. No. 17/129,290.

U.S. Notice of Allowance dated Mar. 15, 2022, in U.S. Appl. No. 16/814,756.

U.S. Requirement for Restriction dated Feb. 24, 2022 in U.S. Appl. No. 17/129,277.

U.S. Restriction Requirement dated Mar. 14, 2022, in U.S. Appl. No. 16/714,555.

\* cited by examiner

COMPLIANT SOLID-STATE IONICALLY CONDUCTIVE COMPOSITE MATERIALS AND METHOD FOR MAKING SAME

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD OF INVENTION

The invention relates generally to the field of solid-state alkali-ion and alkali metal batteries. More particularly, it relates to ionically conductive composite materials and battery components, such as electrolytes and electrodes, that incorporate the ionically conductive composite materials.

BACKGROUND

Solid-state electrolytes present various advantages over liquid electrolytes for primary and secondary batteries. For example, in lithium ion secondary batteries, inorganic solid-state electrolytes may be less flammable than conventional liquid organic electrolytes. Solid-state electrolytes can also faciliate use of a lithium metal electrode by resisting dendrite formation. Solid-state electrolytes may also present advantages of high energy densities, good cycling stabilities, and electrochemical stabilities over a range of conditions. However, there are various challenges in large scale commercialization of solid-state electrolytes. One challenge is maintaining contact between electrolyte and the electrodes. For example, while inorganic materials such as inorganic sulfide glasses and ceramics have high ionic conductivities (over $10^{-4}$ S/cm) at room temperature, they do not serve as efficient electrolytes due to poor adhesion to the electrode during battery cycling. Another challenge is that glass and ceramic solid-state conductors are too brittle to be processed into dense, thin films. This can result in high bulk electrolyte resistance due to the films being too thick, as well as dendrite formation, due to the presence of voids that allow dendrite penetration. The mechanical properties of even relatively ductile sulfide glasses are not adequate to process the glasses into dense, thin films. Improving these mechanical properties without sacrificing ionic conductivity is a particular challenge, as techniques to improve adhesion, such as the addition of a solid polymer binder, tend to reduce ionic conductivity. It is normal to observe more than an order of magnitude conductivity decrease with as little as 1 wt % of binder introduced. Solid-state polymer electrolyte systems may have improved mechanical characteristics that faciliate adhesion and formation into thin films, but have low ionic conductivity at room temperature.

Materials that have high ionic conductivities at room temperature and that are sufficiently compliant to be processed into thin, dense films without sacrificing ionic conductivity are needed for large scale production and commercialization of solid-state batteries.

SUMMARY

The compositions, methods and devices of the present invention each have inventive aspects. One aspect of the invention relates to a solid-state composition that includes an ionically conductive amorphous inorganic material; a first component, wherein the first component is a non-ionically conductive polymer having a number average molecular weight of between 500 g/mol and 50,000 g/mol; and a binder, wherein the binder is a non-ionically conductive polymer having a number average molecular weight of at least 100 kg/mol, wherein the ionically conductive amorphous inorganic material constitutes at least 40% by weight of the solid-state composition, the first component constitutes at least 10% by weight of the solid-state composition, and the binder constitutes between 0.5% and 5% by weight of the solid-state composition.

In some embodiments, the solid-state composition has an ionic conductivity of at least $1 \times 10^{-4}$ S·cm$^{-1}$. In some embodiments, the solid-state composition does not include an added salt. In some embodiments, the first component is a polyalkyl, polyaromatic, or polysiloxane polymer having end groups selected from cyano, thiol, amide, amino, sulfonic acid, epoxy, carboxyl, or hydroxyl groups. Examples of first components include polydimethylsiloxane (PDMS), polybutadiene (PBD), and polystyrene. In some embodiments, the first component is a cyclic olefin polymer. In some embodiments, the number average molecular weight of the first component ranges from about 500 g/mol to 40,000 g/mol, or from 500 g/mol to 25,000 g/mol. In some embodiments, the binder includes styrene. For example, the binder may be styrene-ethylene butylene-styrene (SEBS).

In some embodiments, particles of the ionically conductive amorphous inorganic material are dispersed in a matrix of an organic phase comprising the first component and the binder. In some embodiments, the solid-state composition is an electrolyte. In some embodiments, the ionically conductive amorphous inorganic material constitutes at least 65% by weight of the solid-state composition, the first component constitutes at least 10% by weight of the solid-state composition, and the binder constitutes between 0.5% and 5% by weight of the solid-state composition. In some embodiments, the ionically conductive amorphous inorganic material constitutes at least 80% by weight of the solid-state composition, with the balance being the first component and the binder. In some embodiments, the ionically conductive amorphous inorganic material constitutes at least 85% by weight of the solid-state composition, with the balance being the first component and the binder.

In some embodiments, the first component has a glass transition temperature (Tg) of less than $-50°$ C. In some embodiments, the binder has a glass transition temperature (Tg) greater than $70°$ C. In some embodiments, the first component has a glass transition temperature (Tg) of less than $-50°$ C. and the binder has a glass transition temperature (Tg) greater than $70°$ C. In some embodiments, the ionically conductive amorphous inorganic material, the first component, and the binder together constitute at least 90% of the solid-state composition by weight. In some embodiments, the ionically conductive amorphous inorganic material, the first component, and the binder together constitute at least 99% of the solid-state composition by weight. In some embodiments, the solid-state composition is a film having a thickness of no more than 250 microns. In some embodiments, the solid-state composition does not solvate polysulfides.

Another aspect of the invention relates to a battery including an anode; a cathode; and a solid-state electrolyte composition as described herein operatively associated with the anode and cathode. In some embodiments, the solid-state electrolyte composition includes (a) an ionically conductive amorphous inorganic material; (b) a first component, wherein the first component is a non-ionically conductive polymer having a number average molecular weight of between 500 g/mol and 50,000 g/mol; and (c) a binder, wherein the binder is a non-ion conducting polymer having a number average molecular weight of at least 100 kg/mol, wherein the ionically conductive amorphous inorganic material constitutes at least 40% by weight of the solid-state composition, the first component constitutes at least 10% by weight of the solid-state electrolyte composition, and the binder constitutes between 0.5% and 5% by weight of the solid-state electrolyte composition.

In some embodiments, the solid-state electrolyte composition has an ionic conductivity of at least 1×10−4 S·cm−1. In some embodiments, the solid-state electrolyte composition does not include an added salt.

In some embodiments, the first component is a linear polymer having end groups selected from cyano, thiol, amide, amino, sulfonic acid, epoxy, carboxyl, or hydroxyl groups. In some embodiments, the first component is a polyalkyl, polyaromatic, or polysiloxane polymer having end groups selected from cyano, thiol, amide, amino, sulfonic acid, epoxy, carboxyl, or hydroxyl groups. Examples of first components include polydimethylsiloxane (PDMS), polybutadiene (PBD), and polystyrene. In some embodiments, the first component is a cyclic olefin polymer. In some embodiments, the number average molecular weight of the first component ranges from about 500 g/mol to 40,000 g/mol, or from 500 g/mol to 25,000 g/mol.

In some embodiments, the binder includes styrene. For example, the binder may be styrene-ethylene butylene-styrene (SEBS). In some embodiments, particles of the ionically conductive amorphous inorganic material are dispersed in a matrix of an organic phase comprising the first component and the binder. In some embodiments, the first component has a glass transition temperature (Tg) of less than −50° C. In some embodiments, the binder has a glass transition temperature (Tg) greater than 70oC. In some embodiments, the first component has a glass transition temperature (Tg) of less than −50° C. and the binder has a glass transition temperature (Tg) greater than 70° C. In some embodiments, the ionically conductive amorphous inorganic material, the first component, and the binder together constitute at least 90% of the solid-state composition by weight.

In some embodiments, the ionically conductive amorphous inorganic material, the first component, and the binder together constitute at least 99% of the solid-state electrolyte composition by weight. In some embodiments, the solid-state electrolyte composition is a film having a thickness of no more than 250 microns. In some embodiments, the solid-state electrolyte composition does not solvate polysulfides.

Another aspect of the invention is a solid-state electrode for use in an alkali ion or alkali metal battery. The solid-state electrode includes an inorganic phase comprising an ionically conductive amorphous inorganic material, an electrochemically active material, and an electronically conductive additive; and an organic phase comprising a first component and a binder, wherein the first component is a non-ionically conductive polymer having a number average molecular weight of between 500 g/mol and 50,000 g/mol and the binder is a non-ion conducting polymer having a number average molecular weight of at least 100 kg/mol.

In some embodiments, the ionically conductive amorphous inorganic material constitutes between 15% and 60% by weight of the inorganic phase, the electrochemically active material constitutes between 30% and 80% by weight of the inorganic phase, and the electronically conductive additive constitutes between 5% and 25% of the inorganic phase. In some embodiments, the ionically conductive amorphous inorganic material constitutes between 30% and 50% by weight of the inorganic phase. In some embodiments, the electrochemically active material constitutes between 30% and 50% by weight of the inorganic phase. In some embodiments, the electronically conductive additive constitutes between 10% and 20% of the inorganic phase. In some embodiments, the ionically conductive amorphous inorganic material constitutes between 30% and 50% by weight of the inorganic phase and the electrochemically active material constitutes between 30% and 50% by weight of the inorganic phase.

In some embodiments, the first component constitutes between 50% and 99% by weight of the organic phase, and the binder constitutes between 1% and 50% by weight of the organic phase. In some embodiments, the first component constitutes between 95% and 99% by weight of the organic phase, and the binder constitutes between 1% and 5% by weight of the organic phase.

In some embodiments, the first component is a linear polymer having end groups selected from cyano, thiol, amide, amino, sulfonic acid, epoxy, carboxyl, or hydroxyl groups. In some embodiments, the first component is a polyalkyl, polyaromatic, or polysiloxane polymer having end groups selected from cyano, thiol, amide, amino, sulfonic acid, epoxy, carboxyl, or hydroxyl groups. Examples of first components include polydimethylsiloxane (PDMS), polybutadiene (PBD), and polystyrene. In some embodiments, the first component is a cyclic olefin polymer. In some embodiments, the number average molecular weight of the polymer ranges from about 500 g/mol to 40,000 g/mol, or from 500 g/mol to 25,000 g/mol.

In some embodiments, the binder includes styrene. For example, the binder may be styrene-ethylene butylene-styrene (SEBS). In some embodiments, particles of the inorganic phase are dispersed in a matrix of the organic phase.

In some embodiments, the first component has a glass transition temperature (Tg) of less than −50° C. In some embodiments, the binder has a glass transition temperature (Tg) greater than 70° C. In some embodiments, the first component has a glass transition temperature (Tg) of less than −50° C. and the binder has a glass transition temperature (Tg) greater than 70° C.

In some embodiments, the inorganic phase constitutes at least 85% by weight of the solid-state electrode. In some embodiments, the organic phase constitutes between 3% and 15% by weight of the solid-state electrode.

In some embodiments, the electrochemically active material is selected from the group consisting of lithium cobalt oxide (LCO), lithium manganese oxide (LMO), lithium nickel cobalt aluminum oxide (NCA), lithium iron phosphate (LFP) and lithium nickel cobalt manganese oxide (NCM).

In some embodiments, the electrochemically active material is selected from the group consisting of a carbon-containing material, a silicon-containing material, a tin-containing material, lithium, or a lithium alloyed metal.

In some embodiments, the solid-state electrode is in contact with a solid-state electrolyte that includes a second inorganic phase and a second organic phase, the second inorganic phase including an ionically conductive amorphous inorganic material and the second organic phase including an electrolyte first component, wherein the electrolyte first component is a non-ionically conductive polymer having a number average molecular weight of between 500 g/mol and 50,000 g/mol and an electrolyte binder, wherein the electrolyte binder is a non-ion conducting polymer having a number average molecular weight of at least 100 kg/mol.

Another aspect of the invention relates to a battery including an anode; a cathode; and an electrolyte composition as described herein operatively associated with the anode and cathode. In some embodiments, the anode comprises (a) an inorganic phase comprising an ionically conductive amorphous inorganic material, an electrochemically active material, and an electronically conductive additive; and (b) an organic phase comprising a first component and a binder, wherein the first component is a non-ionically conductive polymer having a number average molecular weight of between 500 g/mol and 50,000 g/mol and the binder is a non-ion conducting polymer having a number average molecular weight of at least 100 kg/mol.

In some embodiments, the cathode comprises (a) an inorganic phase comprising an ionically conductive amorphous inorganic material, an electrochemically active material, and an electronically conductive additive; and (b) an organic phase comprising a first component and a binder, wherein the first component is a non-ionically conductive polymer having a number average molecular weight of between 500 g/mol and 50,000 g/mol and the binder is a non-ion conducting polymer having a number average molecular weight of at least 100 kg/mol.

In some embodiments, the ionically conductive amorphous inorganic material constitutes between 15% and 60% by weight of the inorganic phase, the electrochemically active material constitutes between 30% and 80% by weight of the inorganic phase, and the electronically conductive additive constitutes between 5% and 25% of the inorganic phase.

In some embodiments, the first component constitutes between 50% and 99% by weight of the organic phase, and the binder constitutes between 1% and 50% by weight of the organic phase.

In some embodiments, the first component is a linear polymer having end groups selected from cyano, thiol, amide, amino, sulfonic acid, epoxy, carboxyl, or hydroxyl groups. In some embodiments, the first component is a polyalkyl, polyaromatic, or polysiloxane polymer having end groups selected from cyano, thiol, amide, amino, sulfonic acid, epoxy, carboxyl, or hydroxyl groups. Examples of first components include polydimethylsiloxane (PDMS), polybutadiene (PBD), and polystyrene. In some embodiments, the first component is a cyclic olefin polymer.

In some embodiments, the binder includes styrene. For example, the binder may be styrene-ethylene butylene-styrene (SEBS). In some embodiments, particles of the inorganic phase are dispersed in a matrix of the organic phase.

In some embodiments, the first component has a glass transition temperature (Tg) of less than −50° C. In some embodiments, the binder has a glass transition temperature (Tg) greater than 70° C. In some embodiments, the first component has a glass transition temperature (Tg) of less than −50° C. and the binder has a glass transition temperature (Tg) greater than 70° C.

In some embodiments, the inorganic phase constitutes at least 85% by weight of the solid-state electrode. In some embodiments, the organic phase constitutes between 3% and 15% by weight of the solid-state electrode.

In some embodiments, the electrochemically active material is selected from the group consisting of lithium cobalt oxide (LCO), lithium manganese oxide (LMO), lithium nickel cobalt aluminum oxide (NCA), lithium iron phosphate (LFP) and lithium nickel cobalt manganese oxide (NCM). In some embodiments, the electrochemically active material is selected from the group consisting of a carbon-containing material, a silicon-containing material, a tin-containing material, lithium, or a lithium alloyed metal.

Another aspect of the invention relates to a method of forming a solid-state composite. The method includes mixing ionically conductive amorphous inorganic particles with one or more organic components to form a composite, wherein the one or more organic components comprises a first component and applying external pressure to the composite, wherein applying external pressure increases the ionic conductivity of the composite by a factor of at least two.

In some embodiments, the first component is a polymer having a number average molecular weight of between 500 g/mol and 50,000 g/mol. In some embodiments, the first component is a non-ionically conductive polymer.

In some embodiments, the method further includes releasing the applied pressure. In some embodiments, the further includes heating the composite during the application of pressure to a temperature greater than 70° C., and cooling the composite after heating. In some embodiments, an increase of at least a factor of two in ionic conductivity is maintained after releasing the applied pressure. In some embodiments, the one or more organic components further include a binder, wherein the binder is a non-ion conducting polymer having a number average molecular weight of at least 100 kg/mol.

In some embodiments, the binder has a glass transition temperature (Tg) greater than 21° C. In some embodiments, the binder has a glass transition temperature (Tg) greater than 70° C. In some embodiments, the method further includes heating the composite during the application of pressure to a temperature greater than the Tg of the binder, and cooling the composite after heating.

In some embodiments, the method further includes releasing the applied pressure wherein an increase of at least a factor of two in ionic conductivity is maintained after releasing the applied pressure.

In some embodiments, mixing the ionically conductive amorphous inorganic material with the one or more organic components involves solvent-free mechanical mixing. In some embodiments, the method involves dissolving the one or more organic components in a solvent and forming a slurry that comprises the dissolved organic components and the ionically conductive amorphous inorganic material. In some embodiments, the method involves casting the slurry on a substrate and evaporating the solvent. In some embodiments, the method involves extruding the composite.

In some embodiments, the ionically conductive amorphous inorganic material constitutes at least 40% by weight of the solid-state composition and the first component constitutes at least 10% by weight of the solid-state composition.

In some embodiments, the one or more organic components further include a binder, wherein the binder is a non-ion conducting polymer having a number average molecular weight of at least 100 kg/mol, and the binder constitutes between 0.5% and 5% of the composite by weight.

In some embodiments, the method involves mixing an electrochemically active material and an electronically conductive additive with the one or more organic components.

In some embodiments, the first component is a linear polymer having end groups selected from cyano, thiol, amide, amino, sulfonic acid, epoxy, carboxyl, or hydroxyl groups. In some embodiments, the first component is a polyalkyl, polyaromatic, or polysiloxane polymer having end groups selected from cyano, thiol, amide, amino, sulfonic acid, epoxy, carboxyl, or hydroxyl groups. Examples of first components include polydimethylsiloxane (PDMS), polybutadiene (PBD), and polystyrene. In some embodiments, the first component is a cyclic olefin polymer. In some embodiments, the first component has a glass transition temperature (Tg) of less than −50° C.

Another aspect of the invention relates to a solid-state electrode/electrolyte bilayer including an electrode layer having a first inorganic phase and first organic phase, the first inorganic phase including an ionically conductive amorphous inorganic material, an electrochemically active material, and an electronically conductive additive and the first organic phase including an electrode first component and an electrode binder, wherein the electrode first component is a non-ionically conductive polymer having a number average molecular weight of between 500 g/mol and 50,000 g/mol and the electrode binder is a non-ion conducting polymer having a number average molecular weight of at least 100 kg/mol; and an electrolyte layer disposed on the electrode layer and having a second inorganic phase and a second organic phase, the second inorganic phase including an ionically conductive amorphous inorganic material and the second organic phase including an electrolyte first component, wherein the electrolyte first component is a non-ionically conductive polymer having a number average molecular weight of between 500 g/mol and 50,000 g/mol; and an electrolyte binder, wherein the electrolyte binder is a non-ion conducting polymer having a number average molecular weight of at least 100 kg/mol.

Another aspect of the invention relates to a solid-state composition including an ionically conductive inorganic material; and a first component, wherein the first component is a polymer having a number average molecular weight of less than 100 kg/mol, wherein the ionically conductive amorphous inorganic material constitutes at least 40% by weight of the solid-state composition, the first component constitutes at least 10% by weight of the solid-state composition, and the solid-state composition has an ionic conductivity of at least $1 \times 10^{-4}$ S·cm$^{-1}$ in the absence of a salt.

In some embodiments, ionically conductive inorganic material is amorphous. In some embodiments, the ionically conductive inorganic material is semi-crystalline or crystalline. In some embodiments, the solid-state composition further comprises a binder, wherein the binder is a polymer having a number average molecular weight of at least 100 kg/mol. In some embodiments, the binder constitutes between 0.5% and 5% by weight of the solid-state composition. In some embodiments, the polymer is a non-ionically conductive polymer.

In some such embodiments, the first component is polydimethylsiloxane (PDMS), polybutadiene (PBD), or polystyrene. In some embodiments, the first component is a cyclic olefin polymer. In some embodiments, the first component is a polyalkyl, polyaromatic, or polysiloxane polymer having end groups selected from cyano, thiol, amide, amino, sulfonic acid, epoxy, carboxyl, or hydroxyl groups. In some embodiments, the polymer is an ionically conductive polymer. In some such embodiments, the polymer is a perfluoropolyether (PFPE). In some embodiments, the first component has a glass transition temperature (Tg) of less than −50oC. In some embodiments, the binder has a glass transition temperature greater than 70oC. In some embodiments, the first component has a glass transition temperature (Tg) of less than −50oC and the binder has a glass transition temperature greater than 70oC.

Another aspect of the invention relates to solid-state composition including an ionically conductive inorganic material; and a first component, wherein the first component is a non-ionically conductive polymer having a number average molecular weight of less than 100 kg/mol; and wherein the ionically conductive amorphous inorganic material constitutes at least 40% by weight of the solid-state composition, the first component constitutes at least 10% by weight of the solid-state composition.

In some embodiments, the solid-state composition further comprises a binder, wherein the binder is a non-ionically conductive polymer having a number average molecular weight of at least 100 kg/mol. In some embodiments, the binder constitutes between 0.5% and 5% by weight of the solid-state composition.

Another aspect of the invention relates to a solid-state composition, comprising: a composite comprising ionically conductive inorganic particles and an organic first component, wherein the first component is characterized in that it results in at least a 10× increase in ionic conductivity of the composite upon application of an external pressure of at least 10 atm to the composite as compared to a baseline external pressure of 1 atm, and wherein the first component is non-ionically conductive.

In some embodiments, the ionically conductive inorganic particles are amorphous. In some embodiments, the ionically conductive inorganic particles are semi-crystalline or crystalline. In some embodiments, the solid-state composition further comprises a binder, wherein the binder is a polymer having a number average molecular weight of at least 100 kg/mol. In some embodiments, the binder constitutes between 0.5% and 5% by weight of the solid-state composition. In some embodiments, the binder has a glass transition temperature greater than 70oC. In some such embodiments, the first component is polydimethylsiloxane (PDMS), polybutadiene (PBD), or polystyrene.

In some embodiments, the first component is a cyclic olefin polymer. In some embodiments, the first component is a polyalkyl, polyaromatic, or polysiloxane polymer having end groups selected from cyano, thiol, amide, amino, sulfonic acid, epoxy, carboxyl, or hydroxyl groups. In some embodiments, the first component has a glass transition temperature (Tg) of less than −50oC.

Another aspect of the invention relates to a solid-state composition including composite comprising ionically conductive inorganic particles and a first component, wherein the first component is an alkane having between 12 and 40 carbons and wherein the weight percentage of the first component in the composite is between 2.5% and 60%. In some embodiments, the ionically conductive inorganic particles are amorphous. In some embodiments, the ionically conductive inorganic particles are semi-crystalline or crystalline. In some embodiments, the solid-state composition further comprises a binder, wherein the binder is a polymer having a number average molecular weight of at least 100 kg/mol.

Another aspect of the invention relates to a solid-state composition including a composite of ionically conductive inorganic particles and a first component, wherein the first component is a cyclic olefin polymer or a cyclic olefin copolymer and wherein the weight percentage of the first component in the composite is between 2.5% and 60%.

These and other aspects of the invention are described further below with reference to the Figures.

BRIEF DESCRIPTION OF DRAWINGS

FIG. 8 shows discharge capacity and FIG. 9 shows columbic efficiency.

DETAILED DESCRIPTION

Figure 1:
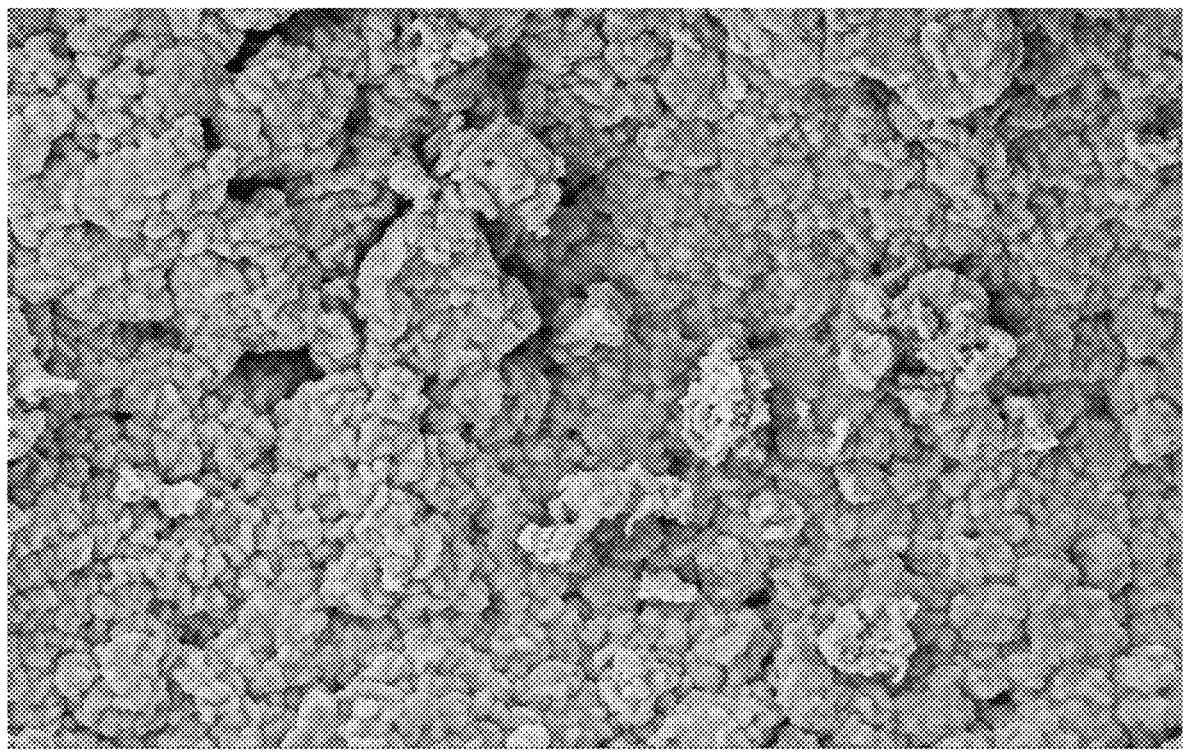
FIG. 1 shows a scanning electron microscope (SEM) image of a pressed pellet of a solid-state composition according to certain embodiments of the present invention.

One aspect of the present invention relates to ionically conductive solid-state compositions that include ionically conductive inorganic particles in a matrix of an organic material. The resulting composite material has high ionic conductivity and mechanical properties that facilitate processing. In particular embodiments, the ionically conductive solid-state compositions are compliant and may be cast as films.

Another aspect of the present invention relates to batteries that include the ionically conductive solid-state compositions described herein. In some embodiments of the present invention, solid-state electrolytes including the ionically conductive solid-state compositions are provided. In some embodiments of the present invention, electrodes including the ionically conductive solid-state compositions are provided.

Particular embodiments of the subject matter described herein may have the following advantages. In some embodiments, the ionically conductive solid-state compositions may be processed to a variety of shapes with easily scaled-up manufacturing techniques. The manufactured composites are compliant, allowing good adhesion to other components of a battery or other device. The solid-state compositions have high ionic conductivity, allowing the compositions to be used as electrolytes or electrode materials. In some embodiments, ionically conductive solid-state compositions enable the use of lithium metal anodes by resisting dendrites. In some embodiments, the ionically conductive solid-state compositions do not dissolve polysulfides and enable the use of sulfur cathodes.

Further details of the ionically conductive solid-state compositions, solid-state electrolytes, electrodes, and batteries according to embodiments of the present invention are described below.

The ionically conductive solid-state compositions may be referred to as hybrid compositions herein. The term "hybrid" is used herein to describe a composite material including an inorganic phase and an organic phase. The term "composite" is used herein to describe a composite of an inorganic material and an organic material.

In some embodiments of the present invention, the organic material includes a first component that, on application of external pressure, facilitates movement of the ionically conductive particles in the composite. The first component is liquid or a soft solid at the temperature at which external pressure is applied to the solid-state composition.

In some embodiments, the first component may be characterized as having a liquid or liquid-like nature at least at the temperature at which external pressure is applied. The combination of pressure and the liquid or liquid-like nature of the first component deliver conductivity values close to the conductivity of the pristine solid-state ionically conductive particles. The result is highly conductive, dense, and compliant material that can be easily processed to desired shapes. Pristine refers to the particles prior to incorporation into the composite. According to various embodiments, the material has at least half, at least 80%, or at least 90% of the ionic conductivity of the particles.

The first component may be any compound that is compatible with the solid-state ionically conductive particles, is non-volatile, and is non-reactive to battery components such as electrodes. It may be further characterized by being non-polar or having low-polarity. The first component may interact with inorganic phase such that the components mix uniformly and microscopically well, but without reactivity between them. Interactions can include one or both of physical or chemical interactions. A first component that is non-reactive to the inorganic phase may still form bonds with the surface of the particles, but does not degrade or change the composition of the inorganic phase. Examples of classes of first components include long chain alkanes and polymers. Specific examples of first components are described further below.

As indicated above, the first component is a component that is a liquid or a soft solid at the time when external pressure is applied. In some embodiments, the first component may be a solid at room temperature or other operating temperature and be liquid or liquid-like at an elevated temperature, with the external pressure applied at the elevated temperature when the first component is in the liquid or liquid-like state. With this approach, effective particle-to-particle contact can be locked in by applying pressure during the cooling and solidification or hardening of the first component. Particle-to-particle contact and conductivity remains high after pressure is released. In some embodiments, high ionic conductivity can be maintained after pressure is released by using an appropriate solid-state high molecular weight polymer binder in a three-component system, discussed further below. In some other embodiments, the first component may be liquid or liquid-like at room temperature or other operating temperature with external pressure applied. In some such cases, pressure may be maintained throughout operation to main high conductivity.

In some embodiments, the solid-state compositions include a small amount of a solid-state high molecular weight polymer binder. Such systems are referred to as three-component systems, the three components being the ionically conductive inorganic particles, the first component, and the solid-state high molecular weight polymer binder. The presence of the first component enables application of a solid-state high molecular weight polymer binder without sacrificing high conductivity. This result is significant because without the first component, the addition of even a small amount (1-5 wt %) of a solid-state high molecular weight polymer binder to a solid-state ion conductor can result in a drastic decrease in the conductivity. In some embodiments, the high conductivity of the composition is achieved by better mobility of the solid-state particles when in a first component, so that effective particle-to-particle contact can be achieved even when the solid-state high molecular weight polymer binder is present. The solid-state high molecular weight polymer binder can facilitate improved mechanical properties. Details of the inorganic phase and organic phase of the compositions are described below.

The term "number average molecular weight" or "$M_n$" in reference to a particular component (e.g., a first component or high molecular weight polymer binder) of a solid-state composition refers to the statistical average molecular weight of all molecules of the component expressed in units of g/mol. The number average molecular weight may be determined by techniques known in the art such as, for example, gel permeation chromatography (wherein $M_n$ can be calculated based on known standards based on an online detection system such as a refractive index, ultraviolet, or other detector), viscometry, mass spectrometry, or colligative methods (e.g., vapor pressure osmometry, end-group determination, or proton NMR). The number average molecular weight is defined by the equation below, $$M_n = \frac{\Sigma N_i M_i}{\Sigma N_i}$$

wherein $M_i$ is the molecular weight of a molecule and $N_i$ is the number of molecules of that molecular weight.

The term "weight average molecular weight" or "$M_w$" in reference to a particular component (e.g., a first component or high molecular weight polymer binder) of a solid-state composition refers to the statistical average molecular weight of all molecules of the component taking into account the weight of each molecule in determining its contribution to the molecular weight average, expressed in units of g/mol. The higher the molecular weight of a given molecule, the more that molecule will contribute to the $M_w$ value. The weight average molecular weight may be calculated by techniques known in the art which are sensitive to molecular size such as, for example, static light scattering, small angle neutron scattering, X-ray scattering, and sedimentation velocity. The weight average molecular weight is defined by the equation below, $$M_w = \frac{\Sigma N_i M_i^2}{\Sigma N_i M_i}$$

wherein '$M_i$' is the molecular weight of a molecule and '$N_i$' is the number of molecules of that molecular weight. In the description below, references to molecular weights of particular polymers refer to number average molecular weight.

Inorganic Phase

The inorganic phase of the composite materials described herein conducts alkali ions. In some embodiments, it is responsible for all of the ion conductivity of the composite material, providing ionically conductive pathways through the composite material.

In some embodiments, the inorganic phase is a particulate solid-state material that conducts alkali ions. In the examples given below, lithium ion conducting materials are chiefly described, though sodium ion conducting or other alkali ion conducting materials may be employed. According to various embodiments, the materials may be glass particles, ceramic particles, or glass ceramic particles. The solid-state compositions described herein are not limited to a particular type of compound but may employ any solid-state inorganic ionically conductive particulate material, examples of which are given below.

In some embodiments, the inorganic material is a single ion conductor, which has a transference number close to unity. The transference number of an ion in an electrolyte is the fraction of total current carried in the electrolyte for the ion. Single-ion conductors have a transference number close to unity. According to various embodiments, the transference number of the inorganic phase of the solid electrolyte is at least 0.9 (for example, 0.99).

The inorganic phase may be an oxide-based composition, a sulfide-based composition, or a phosphate-based composition, and may be crystalline, partially crystalline, or amorphous. In certain embodiments, the inorganic phase may be doped to increase conductivity. Examples of solid lithium ion conducting materials include perovskites (e.g., $Li_{3x}La_{(2/3)-x}TiO_3$, $0 \leq x \leq 0.67$), lithium super ionic conductor (LISICON) compounds (e.g., $Li_{2+2x}Zn_{1-x}GeO_4$, $0 \leq x \leq 1$; $Li_{14}ZnGe_4O_{16}$), thio-LISICON compounds (e.g., $Li_{4-x}A_{1-y}B_yS_4$, A is Si, Ge or Sn, B is P, Al, Zn, Ga; $Li_{10}SnP_2S_{12}$), garnets (e.g. $Li_7La_3Zr_2O_{12}$, $Li_5La_3M_2O_{12}$, M is Ta or Nb); NASICON-type Li ion conductors (e.g., $Li_{1.3}Al_{0.3}Ti_{1.7}(PO_4)_3$), oxide glasses or glass ceramics (e.g., $Li_3BO_3$—$Li_2SO_4$, $Li_2O$—$P_2O_5$, $Li_2O$—$SiO_2$), sulfide glasses or glass ceramics (e.g., $75Li_2S$-$25P_2S_5$, $Li_2S$—$SiS_2$, $LiI$—$Li_2S$—$B_2S_3$) and phosphates (e.g., $Li_{1-x}Al_xGe_{2-x}(PO_4)_3$ (LAGP), $Li_{1+x}Ti_{2-x}Al_x(PO_4)$). Further examples include lithium rich anti-perovskite (LiRAP) particles. As described in Zhao and Daement, Jour J. Am. Chem. Soc., 2012, 134 (36), pp 15042-15047, incorporated by reference herein, these LiRAP particles have an ionic conductivity of greater than $10^{-3}$ S/cm at room temperature.

Examples of solid lithium ion conducting materials include sodium super ionic conductor (NASICON) compounds (e.g., $Na_{1+x}Zr_2Si_xP_{3-x}O_{12}$, $0<x<3$). Further examples of solid lithium ion conducting materials may be found in Cao et al., Front. Energy Res. (2014) 2:25 and Knauth, Solid State Ionics 180 (2009) 911-916, both of which are incorporated by reference herein.

Further examples of ion conducting glasses are disclosed in Ribes et al., J. Non-Cryst. Solids, Vol. 38-39 (1980) 271-276 and Minami, J. Non-Cryst. Solids, Vol. 95-96 (1987) 107-118, which are incorporated by reference herein.

According to various embodiments, an inorganic phase may include one or more types of inorganic ionically conductive particles. The particle size of the inorganic phase may vary according to the particular application, with an average diameter of the particles of the composition being between 0.1 µm and 500 µm for most applications. In some embodiments, the average diameter is between 0.1 µm and 100 µm. In some embodiments, a multi-modal size distribution may be used to optimize particle packing. For example, a bi-modal distribution may be used. In some embodiments, particles having a size of 1 µm or less are used such that the average nearest particle distance in the composite is no more than 1 µm. This can help prevent dendrite growth.

The inorganic phase may be manufactured by any appropriate method. For example, crystalline materials may be obtained using different synthetic methods such as sol-gel and solid state reactions. Glass electrolytes may be obtained by mechanical milling as described in Tatsumisago, M.; Takano, R.; Tadanaga K.; Hayashi, A. J. Power Sources 2014, 270, 603-607, incorporated by reference herein.

In certain embodiments, the inorganic phase is an amorphous glass material rather than a crystalline glass-ceramic material. For certain formulations of the solid-state composition, conductivity is significantly improved by use of an amorphous glass material. This is because crystalline and semi-crystalline ionically conductive particles can have anisotropic conductive paths, whereas amorphous materials have isotropic conductive paths. In some embodiments in which crystalline and semi-crystalline ionically conductive particles are used, sintering may be used to increase ionic conductivity.

Organic Phase

The organic phase provides materials properties, such as compliance and density, that facilitate processing of the composites and their use batteries. The organic phase includes one or more components that, on application of pressure, allow the ionic conductivity of the composite to increase.

The ionically conductive compositions described herein may include an inorganic particulate phase in a matrix of an organic phase. According to various embodiments, the organic phase may include one or more components. There are several considerations in selecting the one or more components of the organic phase, including ionic conductivity and material properties of the formed compositions, and material properties relevant to manufacturing.

In many embodiments, the ionic conductivity is supplied entirely by the inorganic phase, with the organic phase being non-ionically conductive. Each of the one or more components of the organic phase may be non-ionically conductive. During processing of the composite, the organic phase allows inorganic phase particle-to-particle contact to be established. The particle-to-particle contacts establish conductive pathways resulting in high ionic conductivity.

The ionically conductive compositions are not brittle and can be processed into a variety of shapes. In some embodiments, the compositions can be densified by application of pressure. The compositions have material properties such as density, modulus, and hardness that are sufficient to resist dendrite formation in some embodiments. The organic phase occupies the space between inorganic particles.

The organic phase of the composition is such that external pressure applied during processing allows particle-to-particle contact as described above. In some embodiments, the organic phase allows pressure to be released while maintaining the particle-to-particle contact and high ionic conductivity.

Described below are "two-component" and "three-component" hybrid compositions. In the two-component composition, the organic phase has one component, a relatively low molecular weight component referred to as the "first component." The two-component compositions do not include a high molecular weight polymer binder. In the three-component composition, the organic phase includes the first component and a high molecular weight polymer binder.

The molecular weight of the first component can vary and depends on the type of compound. However, it is significantly less than high molecular weight polymer binders, which generally have molecular weights of 100 kg/mol and above. The first component may be characterized in that application of external pressure to the composite material results in a significant increase in ionic conductivity as a result of the first component. Application of external pressure creates particle-to-particle contacts and high ion conductivity. According to various embodiments, the ionic conductivity may increase by at least 2×, 4×, or 10× on application of at least 10 atm (1.013 MPa) as compared to a baseline applied pressure of 1 atm. In some embodiments, the ionic conductivity may increase by at least 2×, 4×, or 10× on application of at least 10 MPa as compared to a baseline applied pressure of 1 atm (1.013 MPa). The composite may have an ionic conductivity of at least $1 \times 10^{-4}$ S·cm$^1$.

In some embodiments, the first component is a material that is a liquid or behaves as a liquid or similarly to a liquid at one or both of the manufacturing temperature and operating temperature of the composition or battery that includes the composition. The term "behaving as a liquid or similarly to a liquid" means that the first component that allows the particles of the inorganic phase to move easily in the composition on application of pressure. In some embodiments, the first component may be a soft solid that allows the particles of the inorganic phase to move on application of pressure. The first component may be characterized or referred to as a "molecular grease" or "lubricating component," though these terms are not intended to limit the first component to any particle class of compounds.

The presence of the first component in a relatively high amount (2.5-60 wt % of the solid-state composite electrolyte) can provide a material having desirable mechanical properties. According to various embodiments, the material is soft and can be processed to a variety of shapes. In addition, the first component fills voids in the material, resulting in a dense material.

The first component is non-volatile and is compatible with the inorganic phase. Compatibility with the inorganic phase means that the first component interacts with the inorganic phase so that the components mix uniformly and microscopically well, but without reactivity between them. As discussed further below, certain first components may be functionalized for surface interactions with the inorganic phase, however, the first component does not otherwise react or degrade with the inorganic phase. Surface interactions can include covalent bonds, ionic bonds, van der Waals forces, and hydrogen bonds. In some embodiments, surface interactions, if present, are weak at least at the temperature pressure is applied to allow the particles to move easily in the composite.

As indicated above, the first component allows particles of the inorganic phase to move around easily on application of pressure at a temperature or range of temperatures, Tp, at which pressure is to be applied. As such, the first component may be any compatible material that, when in a composite with ionically conductive particles, shows an order of magnitude difference in conductivity on application of external pressure. Applied pressure may be 1-200 MPa according to various embodiments. Examples 5 and 6, below, demonstrate the effect of pressure on ionic conductivity.

Examples of first components are provided below. According to various embodiments, the first component may be characterized according to one or more of the following: glass transition temperature, melting temperature, or viscosity.

In some embodiments, the first component may be a relatively small molecular weight polymer material. The size of the polymer phase may vary, though as noted above, it is significantly less than 100 kg/mol. Examples of sizes range from about 500 g/mol to about 50,000 g/mol. Under applied pressure, a relatively small molecular weight material is able to flow, where a larger material cannot. In some embodiments, the size of the polymer ranges from about 500 g/mol to 40,000 g/mol, or from 500 g/mol to 25,000 g/mol.

Examples of polymeric first components include polymers that have a low glass transition temperature (Tg). According to various embodiments, the polymers have glass transition temperatures of less than about −50° C., less than about −70° C., less than about −90° C., or lower. In some embodiments, a polymeric first component is an elastomer. Examples of polymers include PDMS (Tg of −125° C.) and polybutadiene (PBD) (Tg of −90° C. to −111° C.). Glass transition temperatures as provided herein are examples and may vary depending on the size, particular composition and/or isomeric form of the polymer. For example, the glass transition temperature of PBD depends on the degree of cis, trans, or vinyl polymerization. Particular PBDs include liquid polybutadienes with hydroxyl functional groups and hydrogenated liquid polybutadienes with hydroxyl functional groups. Polymeric first components may be homopolymers or copolymers. For example, random copolymers such as styrene butadiene rubbers (SBR) (Tg of −55° C.), ethylene propylene rubbers (EPRs) (Tg of −60° C.), and isobutylene isoprene rubbers (IIR) (Tg of −69° C.) may be used.

Crystalline polymeric first components may also be characterized in terms of melting temperature Tm. Crystalline polymeric first components may have a melting temperature less than about room temperature in some embodiments. In some embodiments, if the composite is heat processed (as described below), the melting temperature may be higher, e.g., less than 150° C., less than 100° C., or less than 50° C. For example, PDMS (Tm of −40° C.) may be preferred in some embodiments over polyethylene (PE; Tm of 120° C. to 180° C.) as the former is liquid at lower temperatures. Glass transition temperatures as provided herein are examples and may vary depending on the size, particular composition and/or isomeric form of the polymer. Melting temperatures of PBD, for example, vary significantly on the degree of cis, trans, or vinyl polymerization.

In some embodiments, the organic phase is substantially non-ionically conductive, with examples of non-ionically conductive polymers including PDMS, PBD, and the other polymers described above. Unlike ionically conductive polymers such as polyethylene oxide (PEO), polypropylene oxide (PPO), polyacrylonitrile (PAN), poly(methyl methacrylate) (PMMA), which are ionically conductive because they dissolve or dissociate salts such as LiI, non-ionically conductive polymers are not ionically conductive even in the presence of a salt. This is because without dissolving a salt, there are no mobile ions to conduct.

Another class of polymers that may be used are perfluoropolyethers (PFPEs) as described in Compliant glass-polymer hybrid single ion-conducting electrolytes for lithium ion batteries, PNAS, 52-57, vol. 113, no. 1 (2016), incorporated by reference herein. As described therein, PFPEs are ionically conductive, being single ion-conductors for lithium.

In some embodiments, a polymeric first component may be a thermoplastic polymer with a Tg greater than room temperature. Examples include cyclic olefin polymers (COPs), cyclic olefin copolymers (COCs), and polystyrene (PSt; Tg of 100° C.). The glass transition temperature or melting temperature of a COP or COC can vary widely. COPs, COCs, and PSt are examples of thermoplastic polymers that may be used with the heat processing manufacturing methods described further below. In some embodiments, a thermoplastic polymer having a Tg or Tm greater than 70° C. is used.

In many embodiments, the first component is a linear compound, such a linear polymer or long-chain alkane, though branched compounds may also be used in some embodiments. The main chain, or backbone, of the first component is selected such that it does not interact with inorganic phase or coordinate with lithium ions or other alkali ions. Examples of backbones that may be used include saturated or unsaturated polyalkyls, polyaromatics, and polysiloxanes. Examples of backbones that may interact too strongly with the inorganic phase include those with strong electron donating groups such as polyalcohols, polyacids, polyesters, polyethers, polyamines, and polyamides. It is understood that molecules that have other moieties that decrease the binding strength of oxygen or other nucleophile groups may be used. For example, the perfluorinated character of the PFPE backbone delocalize the electron density of the ether oxygens, and allow them to be used as first components. If branched, the branches of the first component may either not functionalized or be functionalized with groups (such as methyl groups) that do not interact with the inorganic phase.

According to various embodiments, the end groups of the first component may or may not be tailored to interact with the particles of the inorganic phase. In some embodiments, the end groups of a polymer are tailored for interaction with the inorganic phase. For example, in some embodiments, the end group is one that can bond, via a covalent bond, an ionic bond, or a hydrogen bond, to the particles of the inorganic phase. Examples of end groups include cyano, thiol, amide, amino, sulfonic acid, epoxy, carboxyl, or hydroxyl groups. The two end groups of a particular polymer may be the same or different. In some embodiments, a mixture of polymers having different end groups may be used. The interaction of the polymer phase to the inorganic particles, as determined by the polymer end groups, can be tailored to obtain a texture suitable for a compliant electrolyte having high ionic conductivity. In such embodiments, the polymer is small enough that the concentration of the end group is high enough to achieve the desired interaction and texture. Examples of sizes range from 500 g/mol to 25,000 g/mol, and depend on the particular polymer used. In some embodiments, the size may be between 500 g/mol to 15,000 g/mol, 500 g/mol to 10,000 g/mol or 500 g/mol to 5000 g/mol.

In some embodiments, the first component is a long-chain alkane ($C_nH_{2n+2}$). In particular, paraffin oils and waxes may be used. Paraffin waxes are mixtures of long-chain alkanes $C_nH_{2n+2}$ having n between 20 and 40. Paraffin oils are smaller, having fewer than twenty carbons. While smaller paraffin oils may be too volatile, larger paraffin oils (e.g., n=17) may be suitable for use. Branched alkanes may also be used. For example, a paraffin wax may be modified by the addition of one or branches off the long-chain alkanes a mixture. Example melting points for paraffin wax are between about 46° C. and 68° C. Paraffin oils are liquid at room temperature.

In some embodiments, the first component is a non-polar or low-polar component. In some embodiments, non-polar components are characterized by having a dielectric constant of less than 3 at all frequencies and low-polar components are characterized by having a dielectric constant between 3 and 5 at low frequency (60 Hz) and room temperature. In the description herein, polarity of a functionalized polymer component is determined by its backbone. For example, a non-polar first component may have a non-polar linear polydimethylsiloxane (PDMS) backbone that is functionalized with polar end groups. On application of external pressure, the ionic conductivity of the composite is significantly increased. Highly polar polymers such as polyvinylidenefluoride (PVDF) are not effective first components as they may interact too strongly with the inorganic phase.

The temperature or range of temperatures Tp at which pressure is to be applied may vary. In some embodiments, pressure may be constantly applied during use with the first component exhibiting liquid or liquid-like characteristics over the range of operating temperatures. Example operating temperatures ranges are from −20° C. to 100° C., or −10° C. to 60° C., 0° C. to 60° C.

In some embodiments, Tp is greater than the operating temperature range. As discussed further below, in some embodiments the composition includes, along with the inorganic phase and the first component, a high molecular weight polymer binder that allows pressure to be released without losing high ionic conductivity.

In some embodiments, a first component may be chosen such that it is responsive to pressure only at temperatures greater than operating temperatures. Pressure may be applied during manufacturing to establish contact between the particles of the inorganic phase. Once the composite is cooled, pressure may be released with the first component solidified or hardened and the particles set in place. For example, a COP having a melting temperature of 70° C., above an operating temperature, may be employed. External pressure is applied at a temperature greater than 70° C. to create good particle-to-particle contact and high ionic conductivity, with the external pressure maintained as the composite is cooled to room temperature. The pressure is then released with the COP solidified and the particles set in place such that the high ionic conductivity is maintained.

The inorganic phase can put an upper limit on acceptable Tp's. In particular, in embodiments in which an amorphous inorganic phase is used, Tp is lower than the temperature at which the inorganic phase will start to undergo phase transitions or otherwise degrade or change. For example, if the inorganic phase starts to crystallize at about 165° C., a manufacturing temperature may be limited to 140° C. According to various embodiments, Tp may range from room temperature (21° C.) to 200° C. or from room temperature to 150° C. Also, as noted above, in some embodiments, Tp is above room temperature. In some such embodiments, Tp may range from 50° C. to 200° C., 50° C. to 150° C., or 50° C. to 100° C., for example.

For first components that have well-defined melting temperature Tm, the first component may be characterized as having a Tm at or below Tp in some embodiments. For example, for crystalline polymers, the first component may be characterized by its melting temperature Tm. Other types of first components, such as paraffins, also may be characterized by their melting temperatures Tm, as described above. In some embodiments, the first component may be further characterized by having a melting temperature above room temperature, or above 50° C. It should be noted, however, that in some embodiments, a first component may be one that has a Tm above Tp, but is soft enough to allow particles to move within the composite under applied pressure.

In some embodiments, a first component is characterized by having a measurable or reported viscosity at Tp. For example, a first component may have a viscosity between 1 and 3,000,000 cp at Tp. (For reference, shortening is reported to have a viscosity of 1,000,000 to 2,000,000 cp.) In some embodiments, the first component is fairly viscous, having a viscosity of at least 2000 cp at Tp. The first component may also be characterized with references to a viscosity at 25° C. of between 2000 cp and 3,000,000 cp. The viscosity of first component may be shear-dependent. For example, it may be a shear-thinning or shear thickening. The first component may be characterized as having a viscosity as measured under no shear stress (e.g., at least 2,000 cp at 25° C. or Tp with no applied shear stress).

In some embodiments, the solid-state compositions include a solid-state polymer binder along with the inorganic phase and the first component. These systems may be referred to as three-component systems. The presence of a small amount of a polymer binder can improve processability, for example, turning a powdery mixture into a castable thin film.

The polymer binder is a high molecular weight (at least 100 kg/mol) polymer. In some embodiments, the polymer binder has a non-polar backbone. Examples of non-polar polymer binders include polymers or copolymers including styrene, butadiene, isoprene, ethylene, and butylene. Styrenic block copolymers including polystyrene blocks and rubber blocks may be used, with examples of rubber blocks including PBD and polyisoprene. The rubber blocks may or may be hydrogenated. Specific examples of polymer binders are styrene ethylene butylene styrene (SEBS), styrene-butadiene-styrene (SBS), styrene-isoprene-styrene (SIS), styrene-butadiene rubber (SBR), PSt, PBD, polyethylene (PE), and polyisoprene (PI).

In some embodiments, the solid-state compositions include a high molecular weight version of one of the first component described above to act as a polymer binder. In such cases, the high molecular weight polymer is either not functionalized or end groups (such as methyl end groups) that do not interact with the inorganic phase. For example, a solid-state composition may include 500 kmol/g PDMS with methyl end groups in addition to a hydroxyl or amino functionalized 900 mol/g (0.9 kmol/g) PDMS. As described above, in some embodiments, the first component and the polymer binder are non-polar polymers. In some embodiments, either of the organic phase components may be characterized by a lack of electron donating groups on its backbone. For example, it may be characterized by a lack of any one of ester, ether, amine, amide, or hydroxyl groups on its backbone.

In some embodiments, the high molecular weight polymer binder is a thermoplastic that has a glass transition temperature or melting temperature greater than operating temperatures. In such cases, pressure may be applied during manufacturing to establish contact between the particles of the inorganic phase. Once the composite is cooled, pressure may be released with the high molecular weight polymer binder solidified or hardened and the particles set in place. In some embodiments, the binder has a glass transition temperature of at least 70° C. For example, a high molecular weight polymer binder may be chosen having a glass transition temperature between 70° C. and 140° C. External pressure is applied at 140° C. to create good particle-to-particle contact, and the composite is cooled to room temperature of 21° C. The pressure is then released with the high molecular weight polymer binder solidified and the particles set in place. Examples of binders having Tg's greater than room temperature include styrene-containing binders such as SEBS. In some embodiments, a thermoplastic binder may be used in a system with a first component that has a low glass transition temperature. For example, in some embodiments, a composite includes a binder having a Tg greater than 70° C. and first component having a Tg of less than −50° C.

Composite Materials

The solid-state compositions described herein generally include an inorganic solid phase and a first component as described above. The compositions may depend in part on the application, with example applications including solid-state electrolytes and solid-state electrodes.

Loading refers to weight percent or volume percent that a component occupies in the composition or part thereof. In the description herein, loadings are provided as weight percentages. The first component loading is large enough that along with the polymer binder, if present, it fills the space between the inorganic particles such that there is no or minimal void space in the composition and has desirable mechanical properties. If the loading is too high, however, it can reduce conductivity. The total polymer loading in a solid-state composite may be between 2.5% and 60%, by weight.

According to various embodiments, the first component loading in the composition is at least 2.5%, at least 5%, at least 10%, at least 11%, at least 12%, at least 13%, at least 14%, at least 15%, at least 16%, at least 17%, at least 18%, at least 19%, at least 20%, at least 22%, at least 24%, at least 26%, at least 28%, or at least 30%, or at least 32%, at least 35% by weight, at least 40%, at least 45%, or at least 50%, in each case by weight. The total polymer loading in the composite material does not exceed 60%.

As noted above, in some embodiments, the compositions include three components: particles of an inorganic ionic conductor, a first component, and a high molecular weight solid-state polymer binder. While the total polymer loading in a three-component composition may be as much as 60% by weight, the amount of the high molecular weight polymer binder may be limited to maintain conductivity. According to various embodiments, the high molecular weight polymer binder is between 0.5% and 10% or between 0.5% and 5% by weight of the material. In some embodiments, the high molecular weight polymer binder is between 0.5% and 4% by weight of the composition, between 0.5% and 3% by weight of the composition, between 0.5% and 2.5% by weight of the composition, between 0.5% and 2% by weight of the composition, or between 0.5% and 1.5% by weight of the composition.

In some embodiments, the solid-state compositions consist essentially of inorganic ionically conductive particles and a first component. In some embodiments, the solid-state compositions consist essentially of ionically conductive particles, a first component, and a solid-state high molecular weight polymer binder. In some embodiments, the solid-state composition may include a mixture of different first components, and or a mixture of different high molecular weight polymer binders. In such cases, the solid-state composition may consist essentially of inorganic ionically conductive particles and a mixture of different first components. In some embodiments, the solid-state composition may consist essentially of inorganic ionically conductive particles, a first component or a mixture of different first components, and a high molecular weight polymer binder or a mixture of high molecular weight polymer binders.

In alternative embodiments, one or more components other than the inorganic ionically conductive particles, one or more first components, and one or more polymer binders may be added to the solid-state compositions. According to various embodiments, the solid-state compositions may or may not include an added salt. Salts such as lithium salts (e.g., $LiPF_6$, LiTFSI), potassium salts, and sodium salts may be added to improve conductivity. However, in some embodiments, they are not used with the contacting ionically conductive particles responsible for all of the ion conduction. In some embodiments, the solid-state compositions include substantially no added salts. "Substantially no added salts" means no more than a trace amount of a salt. In some embodiments, if a salt is present, it does not contribute more than 0.05 mS/cm or 0.1 mS/cm to the ionic conductivity. In some embodiments, the solid-state composition may include one or more conductivity enhancers. In some embodiments, the electrolyte may include one or more filler materials, including ceramic fillers such as $Al_2O_3$. If used, a filler may or may not be an ion conductor depending on the particular embodiment. In some embodiments, the composite may include one or more dispersants. Further, in some embodiments, an organic phase of a solid-state composition may include one or more additional organic components to facilitate manufacture of an electrolyte having mechanical properties desired for a particular application. In some embodiments, discussed further below, the solid-state compositions include electrochemically active material.

The solid-state compositions may be prepared by any appropriate method with example procedures described below with reference to the Examples. Mixing of the solid-state ionically conductive particles and the first component to disperse the particles in the first component can be achieved by mechanical means using planetary mixers. The resulting composite may have a wide range of textures from clay-like solids to pastes depending on the nature of the components and their content. For example, the solid-state compositions described herein may have a rubbery texture and are not in the form of powder, pebbles, or balls. In some embodiments, they are not sticky and may be characterized as cohesive rather than adhesive. In some embodiments, the compositions have a modulus of at least about 9 GPa (about 2.5× the modulus of lithium metal) to prevent the growth of lithium dendrites. The composites prepared by this method may be microscopically dense and compliant and can be processed to different shapes, for example, into pellets.

Uniform films can also be prepared by solution processing methods. In this method, the first component is dissolved in an appropriate solvent that is able to suspend particles of the solid-state on conductor without reacting with or otherwise degrading them. A solid-state polymer binder can also be dissolved at this point to reinforce the final material. The components are mixed well with the help of homogenizer followed by casting the slurry on a selected substrate by a number of industrial methods. The solution processing gives porous films after solvent evaporation. Densification operations (e.g., by rolling in calender machine) may be applied to densify the layer and improve its adhesion to the substrate. In embodiments in which solution processing methods are used, the first component and the polymer binder are soluble in a non-polar solvent. Insoluble polymers such as polyphenylene sulfide (PPS) and polytetrafluoroethylene (PTFE) may not be used.

Examples of methods of producing a composite material by ball-milling are described in Examples 1 and 2. Examples of methods of producing a composite material by solvent casting are described in Example 2. In some embodiments, the ionically conductive films are prepared by extrusion.

External pressure, e.g., on the order of 1 MPa to 200 MPa, or 1 MPa to 100 MPa, is applied to establish high conductivity. The prepared composite (e.g., as a pellet or a thin film) is incorporated to an actual solid-state lithium battery by well-established methods. Continuous external pressure is applied to the assembled battery with the help of screws, springs, clamps, etc. depending on the cell format.

In some embodiments, the solid-state composition is prepared by heat processing, with the pressure applied at a temperature above operating temperature. For example, when the first component is solid or hardened at room temperature or other normal operation temperature, the composite material may be subjected to a heat-cool cycle while pressure is maintained. Similarly, when a high molecular weight polymer binder having a glass transition temperature above the operating temperature is used, the composite material may be subjected to a heat-cool cycle while pressure is maintained. Once cooled, the pressure can be decreased or released completely. An example of preparing a composite material by heat processing is provided in Example 6.

Electrolytes

In one aspect of the invention, solid-state composite electrolytes are provided. The solid-state composite electrolytes may be two-component compositions or three-component compositions described above. The electrolyte may be formed directly on a functional substrate, such as an electrode, or formed on a removable substrate that is removed before assembling the solid-state electrolyte to other components of a battery.

In some embodiments, two-component solid-state composite electrolytes consisting essentially of a first component and the ionically conductive inorganic particles as described above are provided. In some embodiments, three-component solid-state composite electrolytes consisting essentially of a first component, a high molecular weight polymer binder, and ionically conductive inorganic particles as described above are provided. However, there may be other components of the electrolytes as described above. In some such embodiments, the first component, high molecular weight polymer binder (if present), and ionically conductive inorganic particles constitute at least 90% by weight of the solid-state composite electrolyte, and, in some embodiments, at least 95% by weight of the solid-state composite electrolyte.

In some embodiments, ionically conductive amorphous inorganic particles constitutes at least 60% by weight of the solid-state electrolyte. In some such embodiments, the balance of the solid-state electrolyte is the first component and the binder. In some embodiments, ionically conductive amorphous inorganic particles constitutes at least 80% by weight of the solid-state electrolyte. In some such embodiments, the balance of the solid-state electrolyte is the first component and the binder. In some embodiments, ionically conductive amorphous inorganic particles constitutes at least 85% by weight of the solid-state electrolyte. In some such embodiments, the balance of the solid-state electrolyte is the first component and the binder.

Other components can include alkali metal ion salts, including lithium ion salts, sodium ion salts, and potassium ion salts. Examples include $LiPF_6$, LiTFSI, LiBETI, etc. However, in some embodiments, the solid-state electrolytes are substantially free of alkali metal ion salts.

In some embodiments, the electrolyte may include an electrode stabilizing agent that can be used to form a passivation layer on the surface of an electrode. Examples of electrode stabilizing agents are described in U.S. Pat. No. 9,093,722. In some embodiments, the electrolyte may include conductivity enhancers, fillers, or organic components as described above.

The composite solid-state electrolytes may be used in any solid-state alkali-ion or alkali-metal battery, including lithium-ion batteries, sodium-ion batteries, lithium-metal batteries, and sodium-metal batteries. The composite solid-state electrolytes are well-suited for batteries in which dendrite growth is a concern. For example, in some embodiments, an electrolyte for a lithium metal battery is provided. The composite solid-state electrolytes enable the use of lithium metal anodes by resisting dendrites. The composite solid-state electrolytes may be used with any cathode material, including sulfur cathodes. The organic phase components described above do not dissolve polysulfides and are suited for use with lithium-sulfur batteries.

A solid film electrolyte composition of the present invention may be of any suitable thickness depending upon the particular battery design. For many applications, the thickness may be between 10 microns and 250 microns, for example 100 microns. In some embodiments, the electrolyte may be significantly thicker, e.g., on the order of millimeters.

Example loadings for solid-state composite electrodes according to embodiments of the present invention are given below in Table 1.

TABLE 1

Example Loadings for Solid-State Composite Electrolytes

| | Examples | % Weight of Total |
|---|---|---|
| Inorganic ionically conductive particles | Sulfide glass | 40%-97.5% |
| | | 40%-90% |
| | | 65%-90% |

TABLE 1-continued

Example Loadings for Solid-State Composite Electrolytes

|  |  | Examples | % Weight of organic phase |  |
|---|---|---|---|---|
| Organic Phase | First Component | HLBH, LBH, PDMS with molecular weights ranging from 500 g/mol-50,000 g/mol, and mixtures thereof | 50%-99%<br>80%-99%<br>95%-99% | 2.5%-60%<br>10%-60%<br>10%-35% |
|  | High molecular weight polymer binder | SEBS, SBS, SIS, SBR, 100 kg/mol and above, and mixtures thereof | 1%-50%<br>1%-20%<br>1%-5% |  |

Table 1 provides loadings for three-component compositions for which the organic phase includes a high molecular weight polymer binder. For two-component compositions, the high end of each example range for the first component (99%) is replaced by 100%, with the low end of each example range for the binder (1%) replaced by 0.

Electrodes

In one aspect of the invention, electrodes including the solid-state composite compositions are provided. The electrodes include two-component compositions or three-component compositions as described above. The solid-state composite compositions further include an electrode active material, and optionally, a conductive additive. For three-component systems, the high molecular weight polymer binder may constitute between 1% and 50% by weight of the organic phase, with the first component constituting at least 50% by weight of the organic phase. The organic phase consists essentially of the high molecular weight polymer binder and the first component in some embodiments. In other embodiments, it may include one or more additional components as described above. Example loadings of embodiments of the present invention are given below in Table 2.

TABLE 2

Example Loadings for Solid-State Composite Electrodes

|  |  | Examples | % Weight of powder | % Weight of Total |
|---|---|---|---|---|
| Inorganic phase - electrode powder | Active Material | $Li_2S$, LCO, NCA, graphite, silicon | 30-80%<br>30-50% | 85-97% |
|  | Conductive Additive | Activated carbon | 5-25%<br>10-20% |  |
|  | Inorganic ionically conductive particles | Sulfide glass | 15-60%<br>30-50% |  |

|  |  | Examples | % Weight of organic phase |  |
|---|---|---|---|---|
| Organic Phase | First Component | HLBH, LBH, PDMS with molecular weights ranging from 500 g/mol-50,000 g/mol, and mixtures thereof | 50%-99%<br>80%-99%<br>95%-99% | 3-15% |
|  | High molecular weight polymer binder | SEBS, SBS, SIS, SBR, 100 kg/mol and above, and mixtures thereof | 1-50%<br>1%-20%<br>1%-5% |  |

Table 2 provides loadings for three-component compositions for which the organic phase includes a high molecular weight polymer binder. For two-component compositions, the high end of each example range for the first component (99%) is replaced by 100%, with the low end of each example range for the binder (1%) replaced by 0.

In some embodiments, the solid-state electrodes are cathodes including a first component, inorganic ionically conductive particles, and an active material. In some embodiments, the solid-state electrodes are anodes including a first component, inorganic ionically conductive particles, and an active material.

Example cathode active materials include lithium cobalt oxide (LCO), lithium manganese oxide (LMO), lithium nickel cobalt aluminum oxide (NCA), lithium iron phosphate (LFP), and lithium nickel cobalt manganese oxide (NCM). Example anode active materials include graphite and other carbon-containing materials, silicon and silicon-containing materials, tin and tin-containing materials, lithium and lithium alloyed metals.

In some embodiments, the solid-state electrodes are sulfur cathodes including a first component, inorganic ionically conductive particles, and sulfur-containing active material. In some embodiments, the composite solid-state cathodes are incorporated into lithium-sulfur batteries with the composite solid-state cathodes including a first component, a high molecular weight polymer binder, inorganic ionically conductive particles, lithium sulfide ($Li_2S$) particles, and a carbon conductive material.

According to various embodiments, the solid-state electrodes are thin films having thicknesses of less than 200 microns, and in some embodiments, less than 100 microns. The areal capacity may be between 2 $mAh/cm^2$ and 5 $mAh/cm^2$ n some embodiments.

In one aspect of the invention, electrode/electrolyte bilayers that include the solid-state composite compositions are provided. The bilayers include a solid-state composite electrode and a solid-state composite electrolyte as described above. Each of the ionically conductive inorganic particles, the first component, and the high molecular weight polymer binder (if present) may be independently selected for the electrode and the electrolyte, such that each component of the electrode may be the same or different as that in the electrolyte. The solid-state electrodes are thin films having thicknesses of less than about 200 microns, and in some embodiments, less than about 100 microns. The solid-state electrolyte, which contacts the solid-state electrode, may have a thickness of less than about 200 microns. In some embodiments, it is between 5 microns and 50 microns thick, e.g., between 25 microns and 50 microns thick.

An example of a method of producing a solid-state composite electrode is described in Example 9. An example of a method of producing a solid-state composite electrode/electrolyte bilayer is described in Example 10.

Battery

Provided herein are alkali metal batteries and alkali metal ion batteries that include an anode, a cathode, and a compliant solid electrolyte composition as described above operatively associated with the anode and cathode. The batteries may include a separator for physically separating the anode and cathode.

Examples of suitable anodes include but are not limited to anodes formed of lithium metal, lithium alloys, sodium metal, sodium alloys, carbonaceous materials such as graphite, and combinations thereof. Examples of suitable cathodes include, but are not limited to cathodes formed of transition metal oxides, doped transition metal oxides, metal phosphates, metal sulfides, lithium iron phosphate, sulfur and combinations thereof. In some embodiments, the cathode may be a sulfur cathode. Additional examples of cathodes include but are not limited to those described in Zhang et al., US Pat. App. Pub No. 2012/0082903, at paragraph 178, which is incorporated by reference herein. In some embodiments, an electrode such as a cathode can contain a liquid, such as described in Y. Lu et al., *J. Am. Chem. Soc.* 133, 5756-5759 (2011), incorporated by reference herein.

In an alkali metal-air battery such as a lithium-air battery, sodium-air battery, or potassium-air battery, the cathode may be permeable to oxygen (e.g., mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode.

In some embodiments, lithium-sulfur cells are provided, including lithium metal anodes and sulfur-containing cathodes. As noted above, the solid-state composite electrolytes described herein uniquely enable both a lithium metal anode, by preventing dendrite formation, and sulfur cathodes, by not dissolving polysulfide intermediates $Li_2S_n$ that are formed at the cathode during discharge.

A separator formed from any suitable material permeable to ionic flow can also be included to keep the anode and cathode from directly electrically contacting one another. However, as the electrolyte compositions described herein are solid compositions, they can serve as separators, particularly when they are in the form of a film.

As described above, in some embodiments, the solid composite compositions may be incorporated into an electrode of a battery. The electrolyte may be a compliant solid electrolyte as described above or any other appropriate electrolyte, including liquid electrolyte.

In some embodiments, a battery includes an electrode/electrolyte bilayer, with each layer incorporating the ionically conductive solid-state composite materials described herein.

Figure 12:
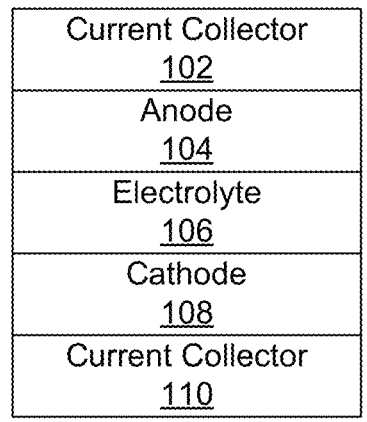
FIGS. 12-14 show examples of schematics of cells according to certain embodiments of the present invention.
Figure 13:
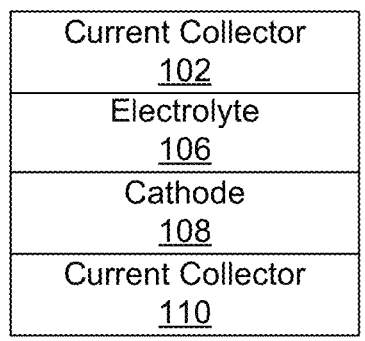
Figure 14:
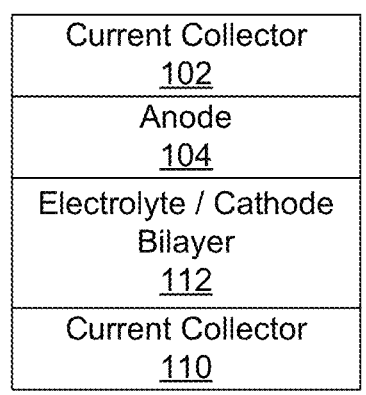

FIG. 12 shows an example of a schematic of a cell 100 according to certain embodiments of the invention. The cell 100 includes a negative current collector 102, an anode 104, an electrolyte 106, a cathode 108, and a positive current collector 110. The negative current collector 102 and the positive current collector 110 may be any appropriate electronically conductive material, such as copper, steel, gold, platinum, aluminum, and nickel. In some embodiments, the negative current collector 102 is copper and the positive current collector 110 is aluminum. The current collectors may be in any appropriate form, such as a sheet, foil, a mesh, or a foam. According to various embodiments, one or more of the anode 104, the cathode 108, and the electrolyte 106 is a solid-state composite including a first component as described above. In some embodiments, each of the anode 104, the cathode 108, and the electrolyte 106 is two- or three-component solid-state composite, as described above. FIG. 13 shows an example of schematic of a lithium metal cell as-assembled 200 according to certain embodiments of the invention. The cell as-assembled 200 includes a negative current collector 102, an electrolyte 106, a cathode 108, and a positive current collector 110. Lithium metal is generated on first charge and plates on the negative current collector 102 to form the anode. One or both of the electrolyte 106 and the cathode 108 may be a two- or three-component as described above. In some embodiments, the cathode 108 and the electrolyte 106 together form an electrode/electrolyte bilayer as described above. FIG. 14 shows an example of a schematic of a cell 100 according to certain embodiments of the invention. The cell 100 includes a negative current collector 102, an anode 104, a cathode/electrolyte bilayer 112, and a positive current collector 110.

All components of the battery can be included in or packaged in a suitable rigid or flexible container with external leads or contacts for establishing an electrical connection to the anode and cathode, in accordance with known techniques. As noted above, in certain embodiments, the battery packaging may be used to apply a pressure of at least 1 MPa to the composition.

Example Embodiments

EXAMPLE 1

Textures of Composite Materials Prepared from Sulfide Glasses and Polymers

PDMS sulfide glass compositions and PBD sulfide glass compositions were prepared and their textures evaluated.

A procedure for the preparation of sulfide glass particles for the PDMS sulfide glass compositions and PBD sulfide glass compositions is as follows: in an argon filled glovebox, 75 g of 10 mm zirconia balls are placed into an 80 mL zirconia cup followed by 0.1 g lithium iodide, 1.94 g lithium sulfide and 2.96 g phosphorus pentasulfide. The cup is sealed, taken out of the glovebox, and secured in the ball mill. The material is milled for 30 minutes at 200 rpm to thoroughly mix the components followed by 18 hours of milling at 400 rpm to react the materials and produce the sulfide glass. This reaction period is performed in 1 hour increments, with a 5 minute rest between each hour of milling and reversal of rotation direction between each increment. The cup is then returned to the glovebox, and the glass is scraped out and broken into large chunks. These glass chunks are returned to the cup with the same balls and the cups are sealed and returned to the ball mill. The glass is milled for an additional 10 min at 200 rpm to obtain fine particles of glass. After returning the cup to the glovebox, the glass is sieved through #80 mesh and the sieved glass is collected.

A procedure for the preparation of PDMS sulfide glass compositions on a 1 g scale is as follows: 0.855 g of the sulfide glass, 0.145 g of polydimethylsiloxane polymer (Gelest, Inc.) and 1.25 g of $ZrO_2$ balls (φ5 mm) are placed in a 30 mL polypropylene cup. The cup is equipped with a vacuum adapter and placed in a Thinky mixer (ARV-50LED, THINKY) for 10 min at 1500 rpm, then manually stirred and mixed for additional 2 min.

A procedure for the preparation of PBD sulfide glass compositions on a 2 g scale is as follows: 1.700 g of the sulfide glass, 0.300 g of PBD polymer (Cray Valley) and 6.2 g of ZrO2 balls (φ5 mm) are placed in a 30 mL polypropylene cup. The cup is equipped with a vacuum adapter and placed in a Thinky mixer (ARV-50LED, THINKY) for 10 min at 1500 rpm, under low vacuum (86 kPa).

Composite materials were prepared from [$75Li_2S$-$25P_2S_5$+2% LiI] sulfide glasses and various PDMS polymers. Polymer size and polymer end group were varied, and was the presence of a high molecular weight polymer binder. The PDMS polymers, high molecular weight PDMS binder (if present), and the sulfide glasses were the only constituents of the compositions. Texture was characterized as shown in Table 3:

TABLE 3

Composite materials prepared from $75Li_2S$—$25P_2S_5$ + 2% LiI and various PDMS polymers

| | Polymer | | Binder | | Glass | |
|---|---|---|---|---|---|---|
| Sample | Type | wt % | Type | wt % | wt % | Texture |
| 1.1 | PDMS-OH (0.5k) | 15 | — | — | 85 | Rubbery |
| 1.2 | PDMS-OH (0.6k) | 23 | — | — | 77 | Sticky, flows |
| 1.3 | PDMS-OH (0.6k) | 15 | — | — | 85 | Sticky, rubbery |
| 1.4 | PDMS-OH (1.1k) | 15 | — | — | 85 | Rubbery |
| 1.5 | PDMS-OH (2.5k) | 15 | — | — | 85 | Rubbery |
| 1.6 | PDMS-OH (0.5k) | 12 | PDMS (110k) | 3 | 85 | Rubbery |
| 1.7 | PDMS-$NH_2$ (0.9k) | 15 | — | — | 85 | Rubbery |
| 1.8 | PDMS-$NH_2$ (0.9k) | 15 | — | — | 85 | Rubbery |
| 1.9 | PDMS-$NH_2$ (2.5k) | 20 | — | — | 80 | Soft, sticky, flows |
| 1.10 | PDMS-$NH_2$ (2.5k) | 18 | — | — | 82 | Sticky, rubbery |
| 1.11 | PDMS-$NH_2$ (2.5k) | 15 | — | — | 85 | Very rubbery |
| 1.12 | PDMS-$NH_2$ (2.5k) | 12 | — | — | 88 | Rubbery |
| 1.13 | PDMS-$NH_2$ (0.9k) | 10 | PDMS (500k) | 5 | 85 | Tougher, rubbery |
| 1.14 | PDMS-$NH_2$ (0.9k) | 7.5 | PDMS (500k) | 7.5 | 85 | Hard Balls |
| 1.15 | PDMS-$NH_2$ (0.9k) | 5 | PDMS (500k) | 10 | 85 | Hard Balls |

As noted above, the solid-state compositions described herein may have a rubbery texture and are not in the form of powder, pebbles or balls. In some embodiments, they are not sticky and may be characterized as cohesive rather than adhesive. The compositions in rows 1.1, 1.3-1.8, 1.11-1.13, 1.16 and 1.17 had desirable rubbery textures. The compositions in rows 1.6 and 1.13-1.15 include high molecular weight polymeric binder and a smaller functionalized polymer.

Solid-state compositions were prepared from [$75Li_2S$-$25P_2S_5$+2% LiI] sulfide glasses and various PBD polymers. Glass weight percentage, polymer size and polymer end group were varied. Texture was characterized as shown in Table 4.

TABLE 4

Compositions prepared from $75Li_2$S-$25P_2S_5$+ 2% LiI and various PBD polymers

| | Polymer | | |
|---|---|---|---|
| Sample | Type | wt % | Texture |
| 2.1 | PBD-OH (1.2k) | 15 | Rubbery |
| 2.2 | LBH-OH (2k) | 15 | Rubbery |

TABLE 4-continued

Compositions prepared from 75Li$_2$S-25P$_2$S$_5$+ 2% LiI and various PBD polymers

| Sample | Polymer Type | wt % | Texture |
|---|---|---|---|
| 2.3 | LBH-OH (2k) | 14 | Sticky, rubbery |
| 2.4 | LBH-OH (2k) | 10 | Rubbery |
| 2.5 | PBD-OH (2.8k) | 15 | Rubbery |
| 2.6 | PBD-epoxy (1.3k) | 15 | Pebbles |
| 2.7 | HLBH-OH (2k) | 15 | Rubbery |

PBD can be represented as shown below with m=number of trans bonds, n=number of vinyl bonds, and o=number of cis bonds. The characteristics of PBD polymers can vary widely according to the concentration of trans, vinyl and cis bonds.

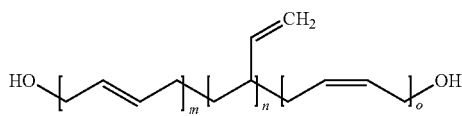

In the table above, PDB refers to 60/20/20 trans/vinyl/cis and LBH refers to 22.5/65/12.5. The PBD polymers and the sulfide glasses were the only constituents of the composites, such that the percentage of the sulfide glass in the compositions was 100% minus the polymer wt %. The compositions in Tables 1 and 2 were prepared in accordance with the general procedures described above.

FIG. 1 shows a scanning electron microscope (SEM) image of a pressed pellet of a solid-state composition according to certain embodiments of the present invention. The polymer component is a PFPE (Fluorolink D10H) (23 wt %) and the glass is 75Li$_2$S-25P$_2$S$_5$. This composition was prepared in the manner described above for the PDMS and PBD compositions. The SEM image in FIG. 1 shows that the compositions are uniform, with the particles distributed evenly.

EXAMPLE 2

Preparation of Solid-State Composite Materials

Solid-state composite materials were prepared by ball milling. These compositions are described below in Table 3 as Samples 3.1-3.5.

To prepare a PFPE sulfide-glass composition (Sample 3.1), the following procedure was used. In a glovebox under inert atmosphere, a 80 mL zirconia cup is loaded with 75 g of 10 mm zirconia balls, 3.85 g of sulfide glass and 1.15 g of diol-terminated PFPE with MW of approximately 1500 g/mol. The cup is sealed so that it remains under inert atmosphere for the entire milling time. The cup is secured into the ball mill and the materials mixed at 200 rpm for 10 minutes. The cup is brought back into the glovebox and the rubbery composite material is scraped from the walls of the cup.

To prepare various PDMS sulfide glass compositions and PBD sulfide glass compositions (Samples 3.2-3.5), the following procedure was used. In a glovebox under inert atmosphere a 80 mL zirconia cup is loaded with 75 g of 10 mm zirconia balls, 4.25 g of sulfide glass, and 0.75 g of selected polymer (see Table 3). The cup is sealed so that it remains under inert atmosphere for the entire milling time. The cup is secured into the ball mill and the materials mixed at 200 rpm for 10 minutes. The cup is brought back into the glovebox and the rubbery material is scraped from the walls of the cup. PDMS used were amino-terminated polydimethylsiloxane (PDMS-NH$_2$ 5 k, Gelest, Inc.) and hydroxy-terminated polydimethylsiloxane (PDMS-OH 4.2 k, Gelest, Inc.) and PBD used were hydroxyl-terminated polybutadiene (LBH2000 2.1 k, Cray Valley) and hydrogenated hydroxyl-terminated polybutadiene (HLBH2000 2.1 k, Cray Valley)

Solid-state composite materials were prepared by solvent casting. These compositions are described below in Table 3 as Samples 3.6-3.8. Sample 3.6 was prepared by the following method: a 30 mL polypropylene cup was loaded with 2.625 g of the sulfide glass and 2.53 g of 14.8 wt. % mixture of amino-terminated polydimethylsiloxane and SEBS (4:1 w/w ratio) in p-xylene. The cup was equipped with a vacuum adapter and placed in a Thinky mixer (ARV-50LED, THINKY) for 10 min at 1500 rpm. The slurry was cast on aluminum foil using a doctor blade coater (MSK-AFA-III, MTI). The film was dried under argon for 1 hr and then under vacuum for additional 12 hrs. All steps were performed in a glovebox under inert atmosphere (argon). Poly (styrene-b-ethylene/butylene-b-styrene) (SEB S, 118 kDa) obtained from Sigma-Aldrich.

Sample 3.7 was prepared similarly to Sample 3.6. 3.500 g of the sulfide glass and 2.50 g of 20 wt. % mixture of hydroxyl-terminated polybutadiene and SEBS (4:1 w/w ratio) in p-xylene were used.

Sample 3.8 was prepared similarly to Sample 3.6. 3.500 g of the sulfide glass and 1.94 g of 26 wt. % mixture of hydrogenated hydroxyl-terminated polybutadiene and SEBS (4:1 w/w ratio) in p-xylene were used. An additional 0.3 g of p-xylene was added to the mixture before mixing.

Comparative solid-state composite materials were prepared. These compositions are described below in Table 4 as comparative Samples 4.1-4.6. Comparative Sample 4.1 was prepared similarly to Sample 3.6. 2.377 g of the sulfide glass and 0.50 g of 25 wt. % solution of SEBS in p-xylene was used. An additional 1.25 g of p-xylene was added to the mixture before mixing.

Comparative Sample 4.2 was prepared similarly to Sample 3.6. 1.800 g of the sulfide glass and 0.80 g of 25 wt. % solution of SEBS in p-xylene was used. An additional 0.135 g of p-xylene was added to the mixture before mixing.

Comparative Sample 4.3 was prepared similarly to Sample 3.6. 1.327 g of the sulfide glass and 0.95 g of 25 wt. % solution of SEBS in p-xylene was used. An additional 0.45 g of p-xylene was added to the mixture before mixing.

Comparative Sample 4.4 and 4.5 were also prepared similarly to Sample 3.6.

Comparative Sample 4.6 was prepared similarly to Sample 3.1. 2.31 g of the glass ceramic (Li7P3S11, MSE Supplies) and 0.69 g of PFPE. The conductivity of the glass-ceramic was stated as 3.2 mS/cm at 25° C.

The sulfide glass particles for the polymer sulfide glass compositions in Samples 3.1-3.7 and Comparative Samples 4.1-4.6 were prepared as follows. In a glovebox under an inert atmosphere each of four 500 mL zirconia cups are loaded with 375 g of 10 mm zirconia balls, 7.04 g lithium sulfide, 10.78 g phosphorus pentasulfide, and 7.18 g lithium iodide. The cups are sealed so that they remain under inert atmosphere for the entire milling time. All four cups are secured into the ball mill, and the mill run at 150 rpm for ½ hour to mix the components. The milling speed is then increased to 300 rpm for a total active milling time of 36 hours, with 10 minute pauses every 30 minutes to prevent overheating of the mill. After each pause milling direction reverses.

The cups are brought back into the glovebox, unsealed, and the newly formed glass electrolyte scraped from the walls of the cup. The glass electrolyte and balls are returned to their original cups and the sealed cups returned to the ball mill. The electrolyte is ground at 200 rpm for 10 minutes. The cups are again returned to the glovebox and the glass removed from each cup, combined, and sieved to 25 microns. The conductivity of the glass was measured to be 0.84 mS/cm at 25° C.

EXAMPLE 3

Conductivity Measurements of Samples 3.1-3.8

To measure conductivity of sample, approximately 300 mg of the sample are loaded into a press with a diameter of 14.8 mm and densified at 300 MPa. This pellet is then used to generate several pellets with 0.25" diameter, which are placed in an insulating spacer with diameter 0.25". Aluminum foil is used as blocking electrodes. The assembly is sealed in air-free pouches in an argon-filled glovebox and placed between two steel plates fixed together with four screws. Pressure is applied by using a torque wrench to apply a specified amount torque to each screw. The actual pressure on the sample is measured using pressure-paper (Fuji Prescale). Thickness is measured before and after the measurement is performed using a micrometer. Measurements are performed at room temperature. All values, unless otherwise reported, are measured at about 50 MPa, which correlates to roughly about 3 Nm of torque on each screw (easily achieved with hand tools).

Table 5 provides the polymer composition, sample preparation and conductivity of Samples 3.1-3.8. The inorganic conductor for all samples was $75Li_2S-25P_2S_5+35\%$ LiI Samples 3.1-3.5 are two component composites of a $75Li_2S-25P_2S_5+35\%$ LiI sulfide glass and a polymer (first component) as described above. (The volume % of the PFPE of Sample 3.1 is approximately equal to the volume percentages of the polymers in Samples 3.2-3.5). Samples 3.2-3.5 demonstrate the composite electrolytes work comparable for non-ion-conducting polymers (PDMS and PBD) as for an ion-conducting PFPE. Notably, no salt was added to the compositions.

Samples 3.6-3.8 are three component composites of the sulfide glass, a polymer (first component), and a solid-state high molecular weight polymer binder as described above. These samples demonstrate that the composite electrolytes work with the inclusion of a high molecular weight polymer binder, which can be important for casting high quality films.

COMPARATIVE EXAMPLE 4

Conductivity Measurements of Comparative Samples 4.1-4.6

The conductivities of Samples 4.1-4.4 were measured as described above in Example 3. Table 6 provides the polymer composition, sample preparation and conductivity of each Comparative Sample 4.1-4.6.

TABLE 6

Conductivity measurements of comparative composite materials

| Comp Sample | Inorganic Conductor | Polymer Type | wt % | Binder Type | wt % | Sample Preparation | σ mS/cm |
|---|---|---|---|---|---|---|---|
| 4.1 | Glass ($75Li_2S-25P_2S_5$ + 35% LiI) | — | — | SEBS | 5 | Solvent Cast | 0.05 |
| 4.2 | Glass ($75Li_2S-25P_2S_5$ + 35% LiI) | — | — | SEBS | 10 | Solvent Cast | 0.01 |
| 4.3 | Glass ($75Li_2S-25P_2S_5$ + 35% LiI) | — | — | SEBS | 15 | Solvent Cast | <0.01 |
| 4.4 | Glass ($75Li_2S-25P_2S_5$) | PBD 200k | 10 | SEBS | 2.5 | Solvent Cast | 0.06 |
| 4.5 | Glass ($75Li_2S-25P_2S_5$) | PBD 200k | 12.5 | — | — | Solvent Cast | 0.06 |
| 4.6 | Glass Ceramic ($Li_7P_3S_{11}$) | PFPE | 23 | — | — | Ball Mill | <0.01 |

TABLE 5

Conductivity measurements of composite materials

| Sample | Polymer Type | wt % | Binder Type | wt % | Sample Preparation | σ mS/cm |
|---|---|---|---|---|---|---|
| 3.1 | PFPE | 23 | — | — | Ball Mill | 0.54 |
| 3.2 | PDMS-OH | 15 | — | — | Ball Mill | 0.62 |
| 3.3 | PDMS-NH$_2$ | 15 | — | — | Ball Mill | 0.65 |
| 3.4 | LBH2000 | 15 | — | — | Ball Mill | 0.34 |
| 3.5 | HLBH2000 | 15 | — | — | Ball Mill | 0.37 |
| 3.6 | PDMS-NH$_2$ | 10 | SEBS | 2.5 | Solvent Cast | 0.34 |
| 3.7 | LBH2000 | 10 | SEBS | 2.5 | Solvent Cast | 0.17 |
| 3.8 | HLBH2000 | 10 | SEBS | 2.5 | Solvent Cast | 0.34 |

Comparative Samples 4.1-4.3 show that without the first component and only a high molecular weight polymer binder, there is little conductivity. Comparative Samples 4.1-4.3 can be compared to Samples 3.6-3.8 and show the addition of a smaller molecular weight first component results in higher conductivity under applied pressure. Comparative Samples 4.4 and 4.5 use 200,000 g/mol PBD polymers with (4.4) and without (4.5) a binder, and show that the molecular weight of the first component is critical to obtaining conductivity. Comparative Samples 4.4 and 4.5 can be compared to 2000 g/mol PBD polymers systems in Table 5.

Comparative Sample 4.6 can be compared to Sample 3.1 and shows that a glass-ceramic inorganic phase results in much lower conductivity than a glass inorganic phase.

EXAMPLE 5

Conductivity vs Applied Pressure of PFPE-Composite (Example 3.1)

Figure 2:
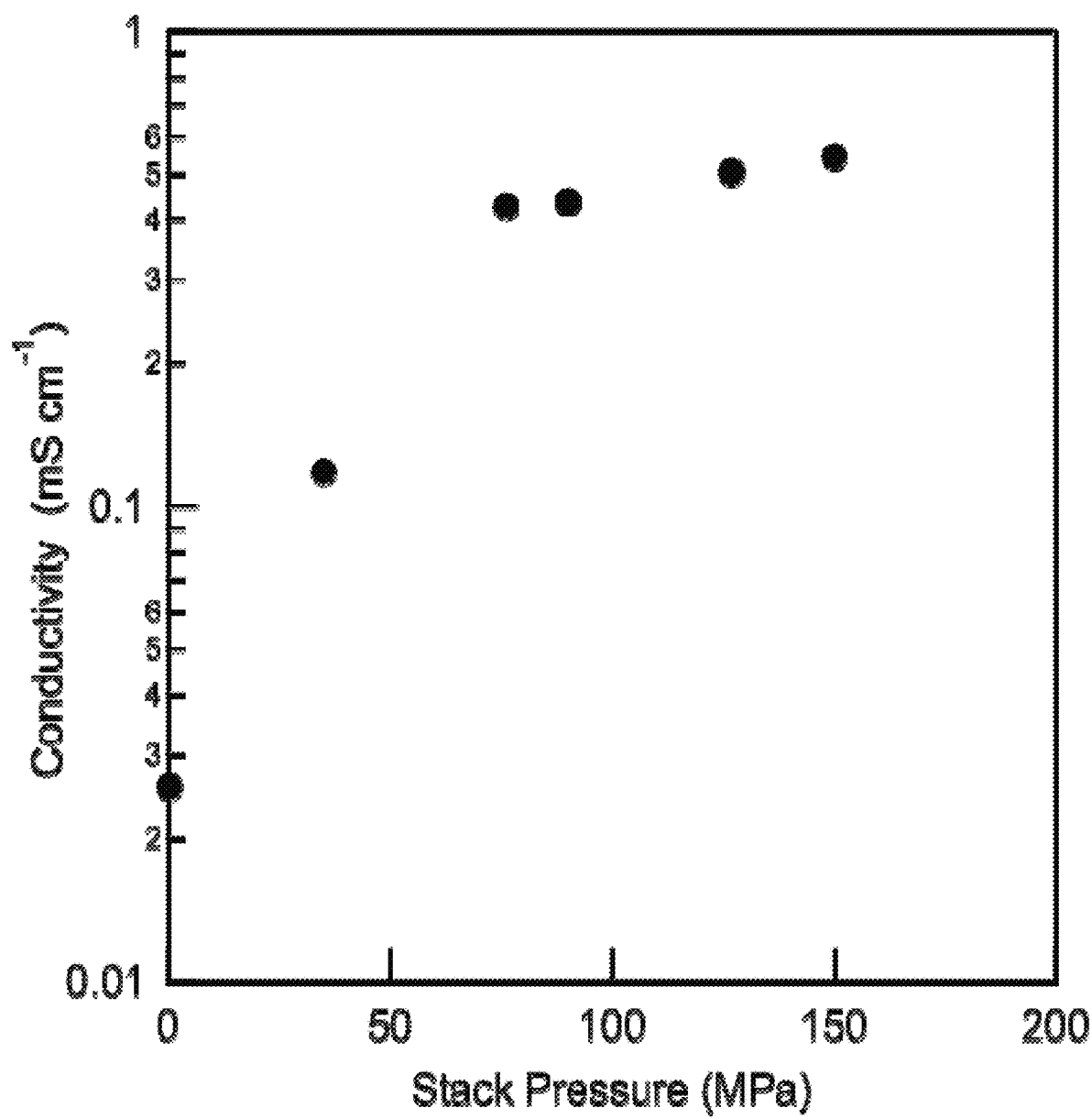
FIG. 2 shows conductivity of a solid-state composition according to certain embodiments of the present invention as a function of applied pressure.

FIG. 2 shows conductivity as a function of applied pressure for the PFPE-composite described above (Sample 3.1 in Examples 2 and 3). Conductivity increases by an order of magnitude with applied pressure. Notably, the most of the conductivity of the pristine glass particles (.84) is recovered by application of pressure.

EXAMPLE 6

Figure 3:
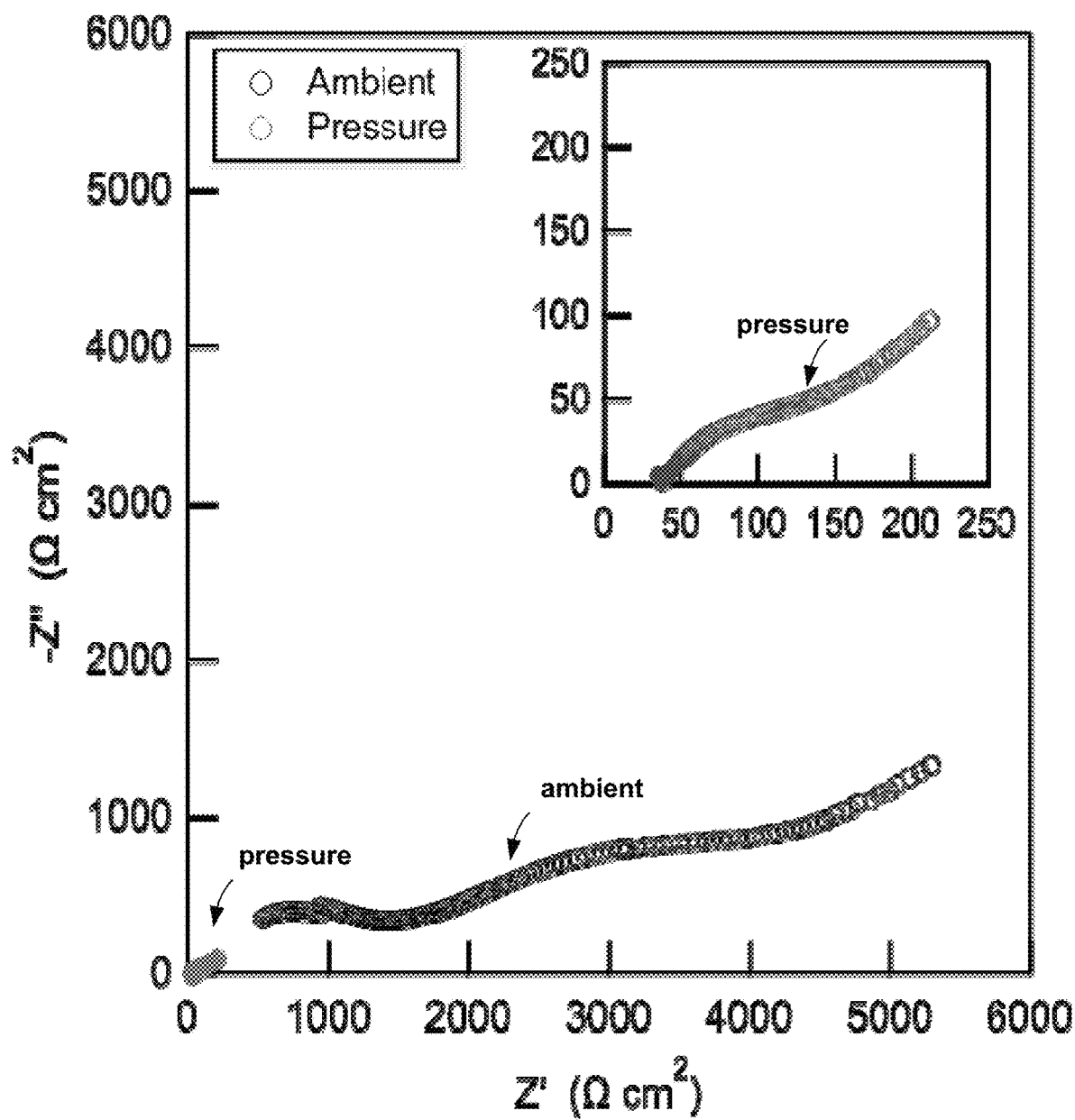
FIG. 3 shows a Nyquist plot of electrochemical impedance (EIS) spectra of a full cell including a glass cathode and pelletized composite solid-state electrolyte according to certain embodiments of the present invention with and without pressure applied.

Electrochemical Impedance Spectra of Full Cells Including Composite Solid-State Electrolytes With and Without Applied Pressure FIG. 3 shows a Nyquist plot of electrochemical impedance (EIS) spectra of a cell 340 (glass cathode and pelletized composite electrolyte) according to certain embodiments of the present invention with and without pressure applied. A close-up of the pressure curve is also shown in the inset. It should be noted that "without pressure applied" refers to a baseline of 1 atm pressure that results from sealing the assembly in air-free pouches as described above, and is denoted in the Figure as "ambient."

The cell 340 was prepared as follows: Ball-milled cathode powder ($Li_2S$/AC/glass, 45/15/40) was spread on carbon paper current collector and densified at 50 MPa. A spacer (Mylar, 100 μm) with 5/16" hole was place on top of the cathode powder, followed by a composite electrolyte pellet (5/16" in diameter, ~0.5 mm thick made from Sample 3.1 material) then a disk of lithium-indium alloy anode (~½" in diameter). The assembled stack was sandwiched between two stainless steel disks and taped with Kapton tape. Finally, aluminum tabs were attached to both sides and the cell was sealed in a pouch. The cells were measured in the fixture described above.

Figure 4:
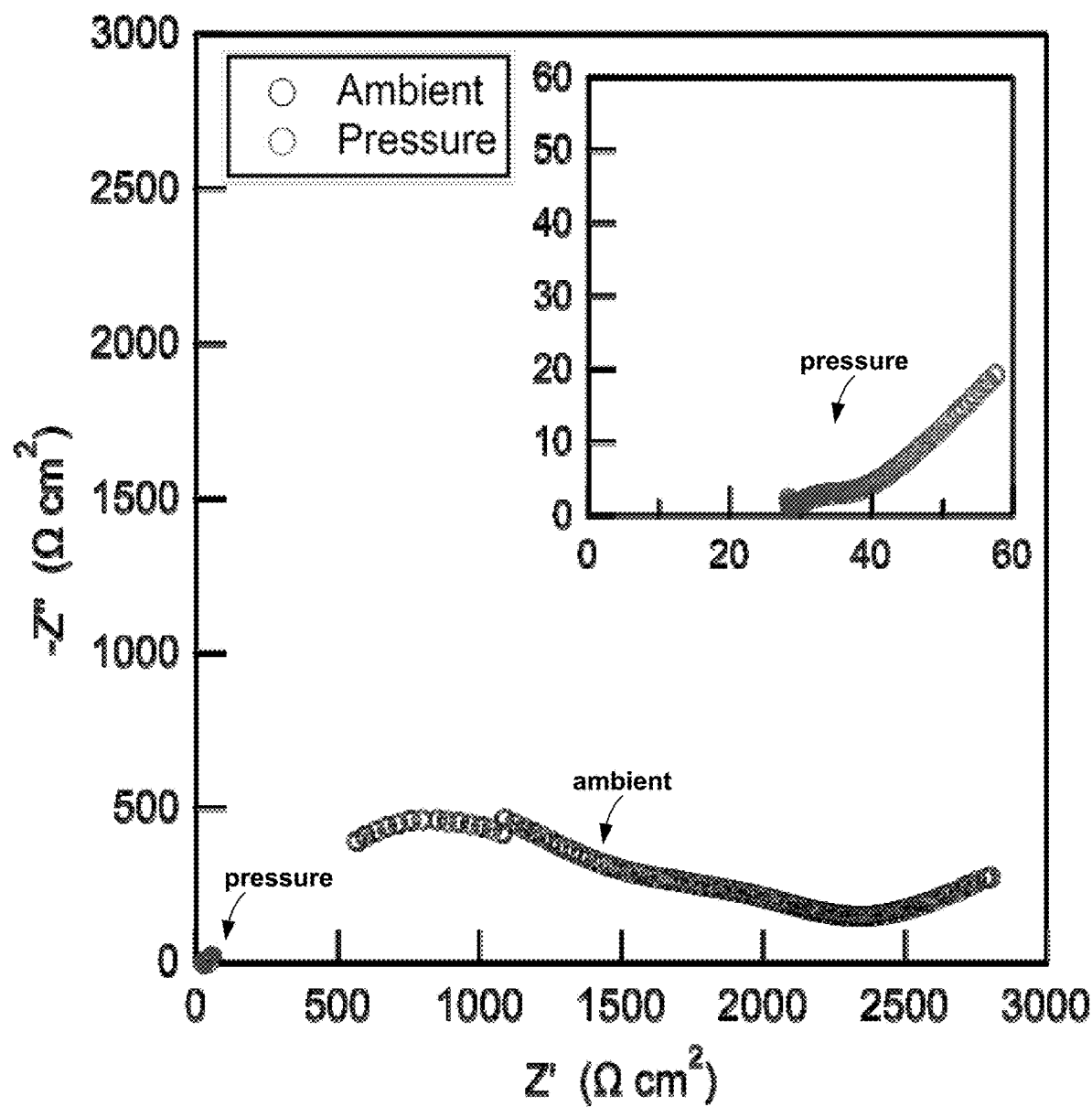
FIG. 4 shows a Nyquist plot of EIS spectra of a full cell including a solid-state composite cathode and pelletized solid-state composite electrolyte according to certain embodiments of the present invention with and without pressure applied.

FIG. 4 shows a Nyquist plot of EIS spectra of cell 341 (film of composite cathode and pelletized composite electrolyte) according to certain embodiments of the present invention with and without pressure applied. A close-up of the pressure curve is also shown in the inset. It should be noted that "without pressure applied" refers to a baseline of 1 atm pressure that results from sealing the assembly in air-free pouches as described above, and is denoted in the Figure as "ambient."

Cell 341 was prepared as follows: A cathode slurry was prepared from mixing ball-milled cathode powder ($Li_2S$/AC/glass, 45/15/40), SEBS, and PDMS-$NH_2$ in xylene and coated on a carbon-coated aluminum current collector with areal capacity of about 1 mAh/$cm^2$. The final weight percent of SEBS and PDMS in the cathode were 2% and 5% respectively. Electrodes with a diameter of ¼" were punched from the current collector. A spacer (Mylar, 100 μm) with 5/16" hole was place on top of the cathode, followed by a composite electrolyte pellet (5/16" in diameter, ~0.5 mm thick made from Sample 3.1 material) then a disk of lithium-indium alloy anode (~½" in diameter). The as-assembled stack was sandwiched between two stainless steel disks and taped with Kapton tape. Aluminum tabs were attached to both sides and the cell was sealed in a pouch. The cells were measured in the same fixture described above for cell 340.

Figure 5:
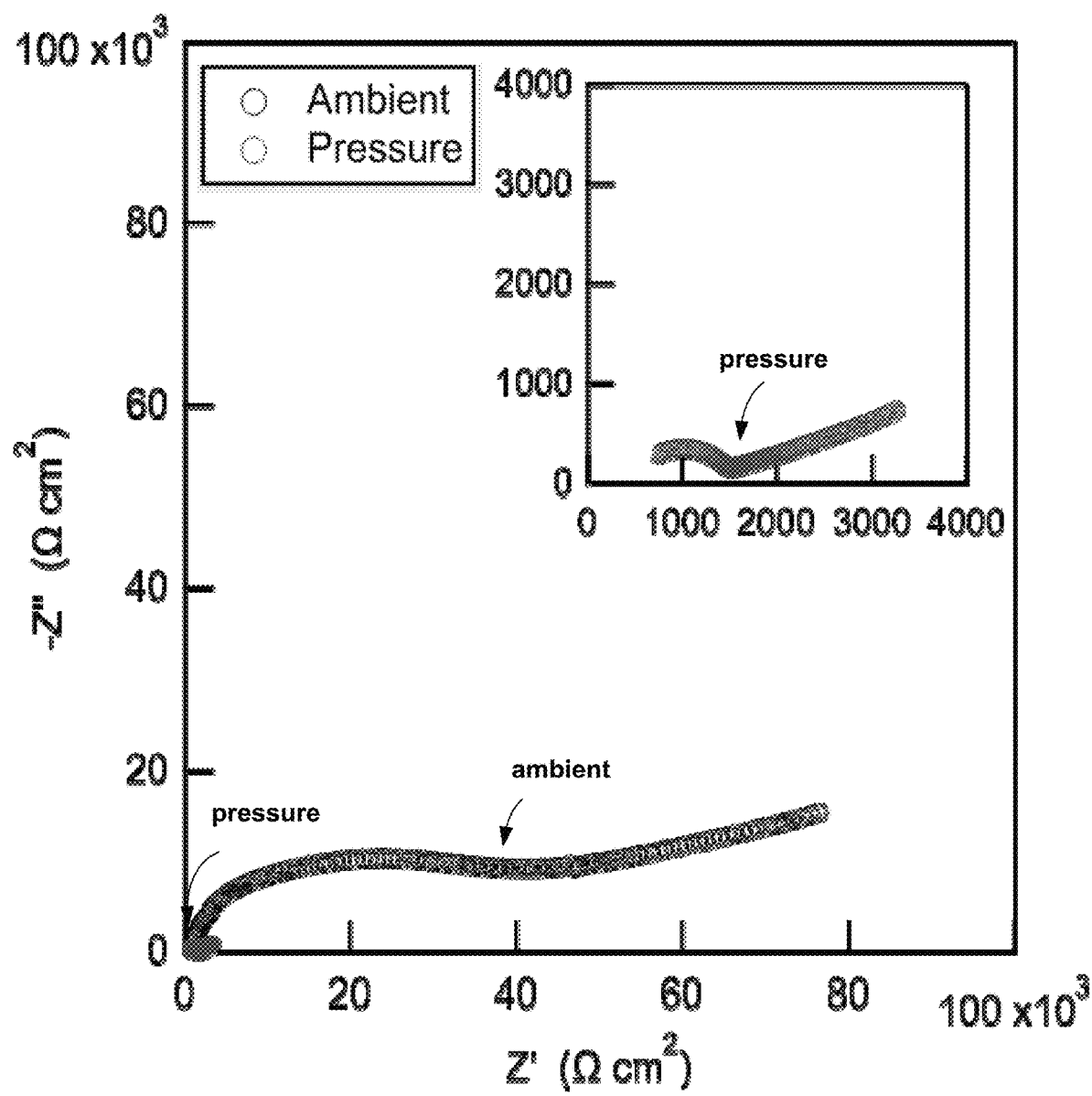
FIG. 5 shows a Nyquist plot of EIS spectra of a full cell including a solid-state composite cathode and pelletized solid-state composite electrolyte according to certain embodiments of the present invention with and without pressure applied.

FIG. 5 shows a Nyquist plot of EIS spectra of cell 342 (cast composite cathode coated with a film of composite electrolyte) according to certain embodiments of the present invention with and without pressure applied. A close-up of the pressure curve is also shown in the inset. It should be noted that "without pressure applied" refers to a baseline of 1 atm pressure that results from sealing the assembly in air-free pouches as described above with reference to cell 340, and is denoted in the Figure as "ambient."

Cell 342 was prepared as follows: A layer of composite electrolyte with composition identical to Sample 3.6 was solvent-cast from xylene directly on top of the cathode. Cathode/electrolyte disks (¾" in diameter) were punched out of the prepared sheet. Battery assembly was done by placing lithium-indium alloy anode (~9/16" in diameter) onto the cathode/electrolyte disk. The as-assembled stack was sandwiched between two stainless steel disks and taped with Kapton tape. Aluminum tabs were attached to both sides and the cell was sealed in a pouch. The cells were measured in the same fixture described above with reference to cell 340.

EXAMPLE 7

Heat Processed Film Conductivities

In a glovebox operating under argon atmosphere, 1.750 g of lithium sulfide glass ($Li_2S$:$P_2S_5$=75:25) was placed in a cup, next, 1.0 g of 25 wt. % solution of hydrogenated polybutadiene diol (Krasol HLBH-P 2000, Cray Valley) and poly(styrene-b-ethylene/butylene-b-styrene) (SEBS, 118 kDa, Sigma-Aldrich) mixed in 4 to 1 w/w ratio in 1,2,4-trimethylbenzene was added, followed by additional 0.15 mL of 1,2,4-trimethylbenzene. The cup was placed in a Thinky mixer (Thinky ARV-SOLED) and mixed at 500 rpm for 30 mins, and then coated on aluminum foil. Once the solvent had evaporated, the film was additionally dried under vacuum for 16 hrs. A 50×70 mm rectangle was cut out from the dry film, pressed under 6 tons load using a vertical laminating press for 2 hrs at 25° C. (not hot pressed) or heated to 140° C. (hot-pressed). The conductivities of films were measured in as Al|Al symmetrical cells sealed pouches under applied forces of 0.1 MPa (ambient), 15 MPa and 75 MPa. (The * indicates the values taking into account the thickness difference resulting from the applied pressure.) The results are in Table 7 below.

TABLE 7

Conductivity measurements of composites with and without heat processing.

| Sample # | Press Temp./° C. | $10^4$ · Cond./S · $cm^{-1}$ Applied Force/MPa | | |
|---|---|---|---|---|
| | | 0.1 | 15 | 75* |
| 5.1 | 25 | 0.033 | 0.24 | 0.95 |
| 5.2 | | 0.029 | 0.31 | 0.93 |
| 5.3 | | 0.033 | 0.26 | 1.00 |
| Average | | 0.031 ± 0.003 | 0.27 ± 0.04 | 0.96 ± 0.04 |
| 5.4 | 140 | 0.72 | 1.00 | 1.2 |
| 5.5 | | 1.8 | 2.0 | 2.0 |
| 5.6 | | 0.85 | 0.94 | 1.1 |
| 5.7 | | 0.64 | 0.71 | 1.0 |
| Average | | 1.0 ± 0.5 | 1.2 ± 0.6 | 1.3 ± 0.5 |

All films are processed under pressure. The films processed at 140° C. retain conductivity even after the pressure is released. While, the films processed at room temperature show an increase in conductivity under applied pressure. The films processed at 140° C. show high conductivity even under ambient pressure. This is because the SEBS (2.5 wt % of the composite) hardens as the film is cooled, thereby locking in particle-to-particle contact. In particular, the styrene component of the SEBS has a glass transition temperature around 100° C.

Figure 6:
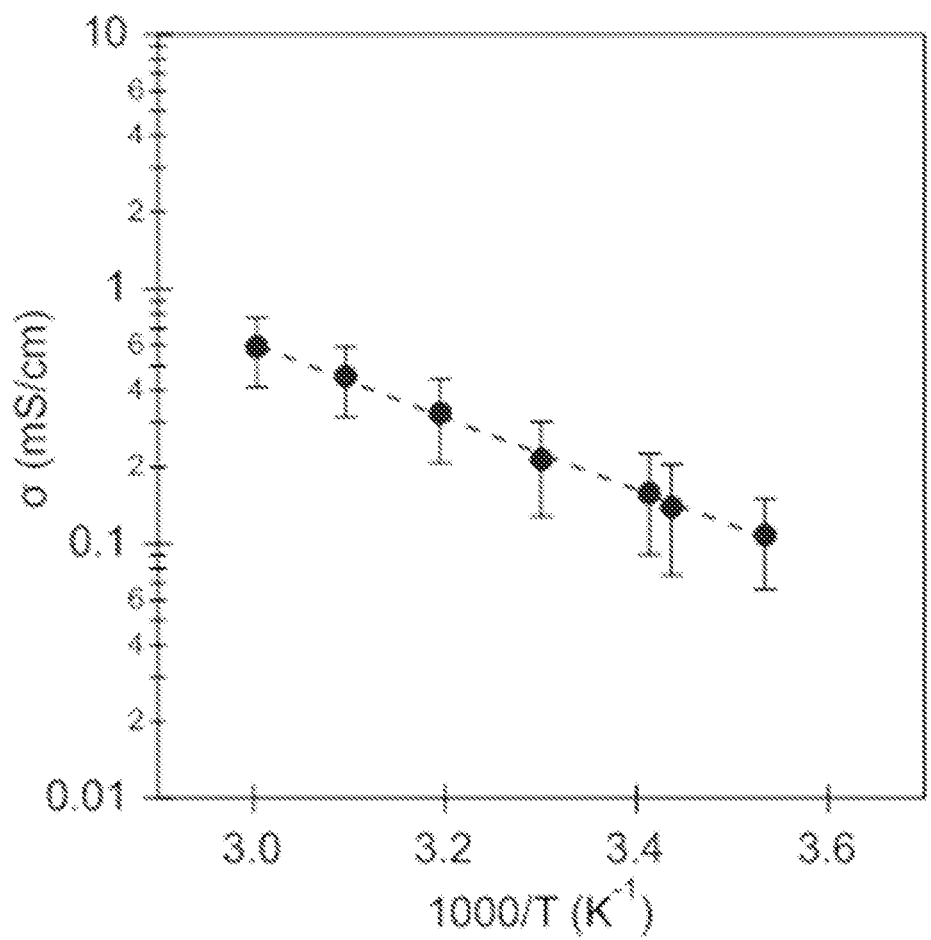
FIG. 6 is a plot of conductivity of a heat-processed solid-state composite electrolyte film according to certain embodiments of the present invention as a function of temperature in a pouch cell with no applied pressure.

FIG. 6 is a plot of conductivity of a heat-processed solid-state composite electrolyte film according to certain embodiments of the present invention as a function of temperature in a pouch cell with no applied pressure. The values shown in the plot are the average of three samples, with the error bars representing the standard deviation. The composition of the solid state composite electrolyte was 87.5 wt % 75:25 Li2S:P2S5 glass, 10 wt % HLBH2000, 2.5 wt % SEBS (118 kDa). The sample was hot-pressed at 140° C. for 2 hours using 17 MPa of pressure.

COMPARATIVE EXAMPLE 8

Heat Processed Comparative Samples 6.1-6.4

Composite films having various compositions were hot-pressed at 140° C. for two hours under 17 MPa of pressure. The compositions and measured conductivities of Comparative Samples 6.1-6.4 are shown in Table 6, below. All films were 85 wt % $Li_2S:P_2S_5$ glass and 15 wt % organic phase. Sample 51 represents an average value of multiple samples.

| Sample | Composition of Organic Phase, wt % of composite electrolyte | Applied Force/MPa 0.1 | 15 $10^{-4} \cdot Cond./S \cdot cm^{-1}$ | 75* | Comments on Mechanical Properties |
|---|---|---|---|---|---|
| 6.1 | 5 wt % SEBS (118 kDa) | 0.17 ± 0.01 | 0.36 ± 0.09 | 0.9 ± 0.1 | |
| 6.2 | 15 wt % SEBS | | <0.01 | | |
| 6.3 | 10 wt % PSt (35k), 5 wt % SEBS (118 kDa) | 0.23 | 0.71 | 1.34 | Brittle |
| 6.4 | 15 wt % PEO (2M) | | <0.01 | | Good mechanical properties |

Sample 6.1 represents average values of composite electrolytes having an organic phase that is pure high molecular weight polymer binder (SEBS, 118 kDa, 5 wt %). Sample 6.1 can be compared to the average of samples 5.4-5.7 and shows that even at low loadings, electrolytes having organic phases of pure non-polar high molecular weight polymer binders have significantly less ionic conductivity than those having a first component such as HLBH-2000 g/mol. Sample 6.2 is a composite having 15 wt % SEBS and shows that conductivity is negligible for composite electrolytes having an organic phase that is pure high molecular weight polymer binder at higher loadings.

Sample 6.3 is 10 wt % polystyrene (PSt) (35 kDa) and 5 wt % SEBS (118 kDa). It can be compared to Sample 6.1 and shows that the addition of the first component increases conductivity under applied force.

Sample 6.4 has an organic phase of a polar polymer (PEO-2M). While the composite film has good mechanical properties, it is not ionically conductive. This demonstrates that polymers having electron donating backbones do not work well.

EXAMPLE 9

Preparation of a Composite Cathode

A dry cathode powder can be prepared as follows: Lithium sulfide ($Li_2S$) and activated carbon (AC) are milled in planetary ball mill (Fritsch) for 36 h at 400 rpm. Sulfide glass is then added to the milling vessel and the contents are milled for an additional 4 hours at 400 rpm. In an example of embodiment, the final composition is 45/15/40 by weight of $Li_2S/AC/Glass$.

The polymeric components of the composite solid-state cathode, including one or more liquid-like first components (HLBH, LBH, PDMS) and one or more high molecular weight polymer binders (e.g., SEBS) are dissolved in a non-polar organic solvent (e.g. xylene). This solution is added to the dry cathode powder and mixed in a centrifugal mixer (THINKY) to prepare the electrode slurry. The slurry is cast on carbon-coated aluminum foil current collector by doctor blade technique, and the solvent evaporated.

EXAMPLE 10

Preparation of a Composite Cathode/Electrolyte Bilayer

Figure 7:
FIG. 7 shows an image of a composite cathode/electrolyte bilayer according to certain embodiments of the present invention.

The polymeric components of the composite electrolyte including one or more liquid-like first components (e.g., HLBH, LBH, PDMS) and one or more high molecular weight polymer binders (e.g. SEBS) are dissolved in a non-polar organic solvent (e.g. xylene). This solution is added to sulfide glass particles and mixed in a centrifugal mixer (THINKY) to prepare the electrolyte slurry. The electrolyte slurry is deposited onto the cathode layer prepared as in Example 9 by doctor blade technique creating a bilayer. After solvent evaporation, the bilayer sheet may be densified by calendering or pressing with or without heating. FIG. 7 shows an image of a composite cathode/composite electrolyte bilayer according to certain embodiments.

EXAMPLE 11

Preparation and Resting of Full Cells Including Composite Cathode/Electrolyte Bilayers Cathode/electrolyte disks are punched out of the prepared cathode/electrolyte bilayer sheet from Example 10. Battery assembly is done by placing lithium-indium alloy anode attached to a copper current collector onto the cathode/electrolyte disk. Tabs are attached, and the stack is sandwiched between two stainless steel disks then sealed in a pouch. The cell may be placed into a stainless-steel cell fixture where a known stack-pressure is applied.

Figure 8:
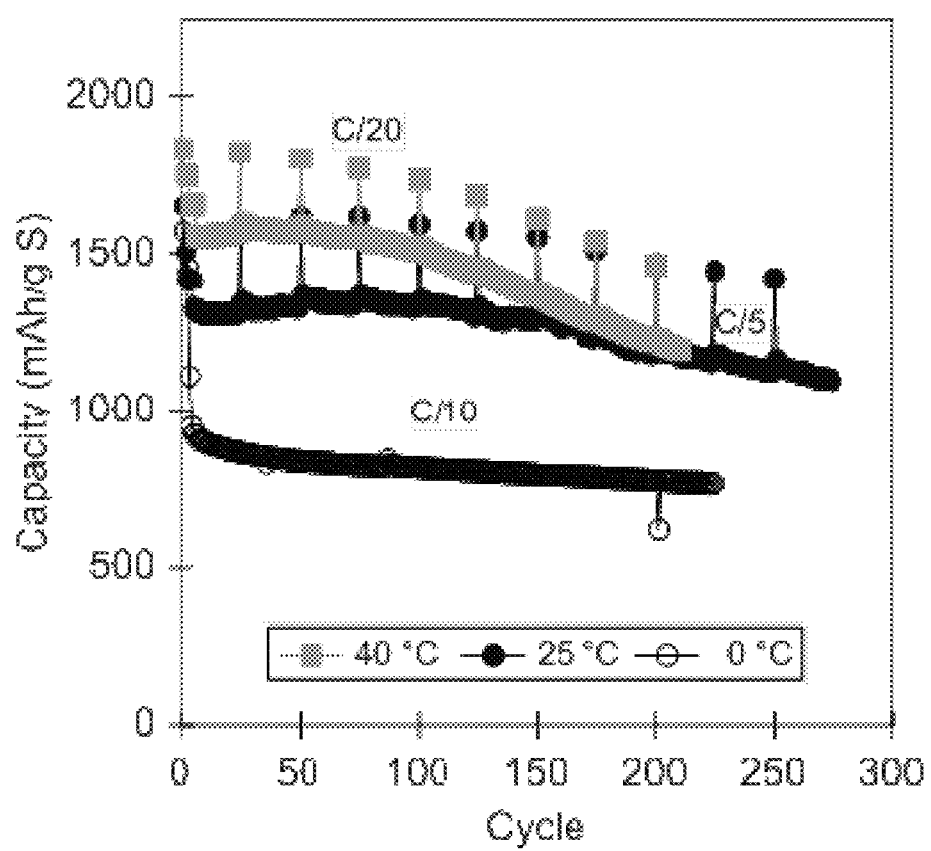
FIGS. 8 and 9 show cycling data for Li—In|Composite Electrolyte|Sulfur cells according to certain embodiments of the present invention at three different temperatures (40° C., 25° C., and 0°).
Figure 9:
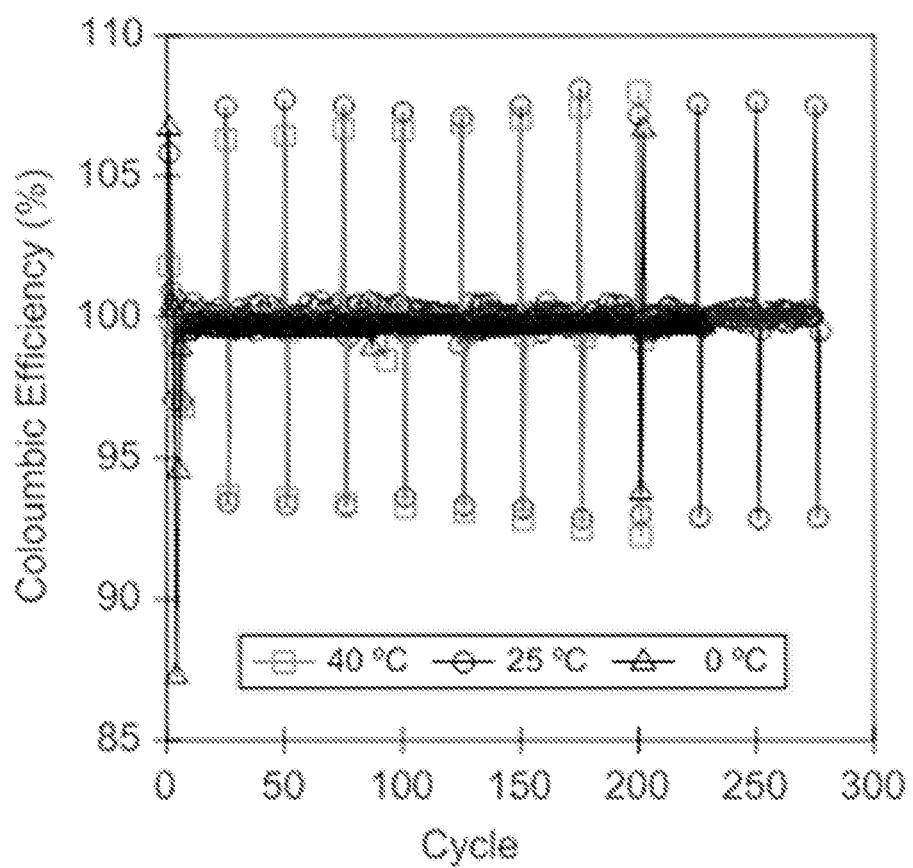

FIGS. 8 and 9 show cycling data for Li—In|Composite Electrolyte|Sulfur cells according to certain embodiments of the present invention at three different temperatures (40° C., 25° C., and 0°). FIG. 8 shows discharge capacity and FIG. 9 shows columbic efficiency (CE). The area of the cells is 1.6 $cm^2$ and the loading is 2.0 $mAh/cm^2$. A C/5 rate corresponds to 0.36 $mAh/cm^2$. FIG. 9 shows very stable room temperature (25° C.) cycling with high capacity utilization. The utilization is good for moderately high loading and percent active material (45% $LiS_2$). The results also show reasonable low-temperature performance for a solid-state cell, higher than what would be expected for a polymer-containing electrolyte. FIG. 9 shows that the CE is near unity. This suggests a fully reversible process, despite the participation of glass in the redox process.

Figure 10:
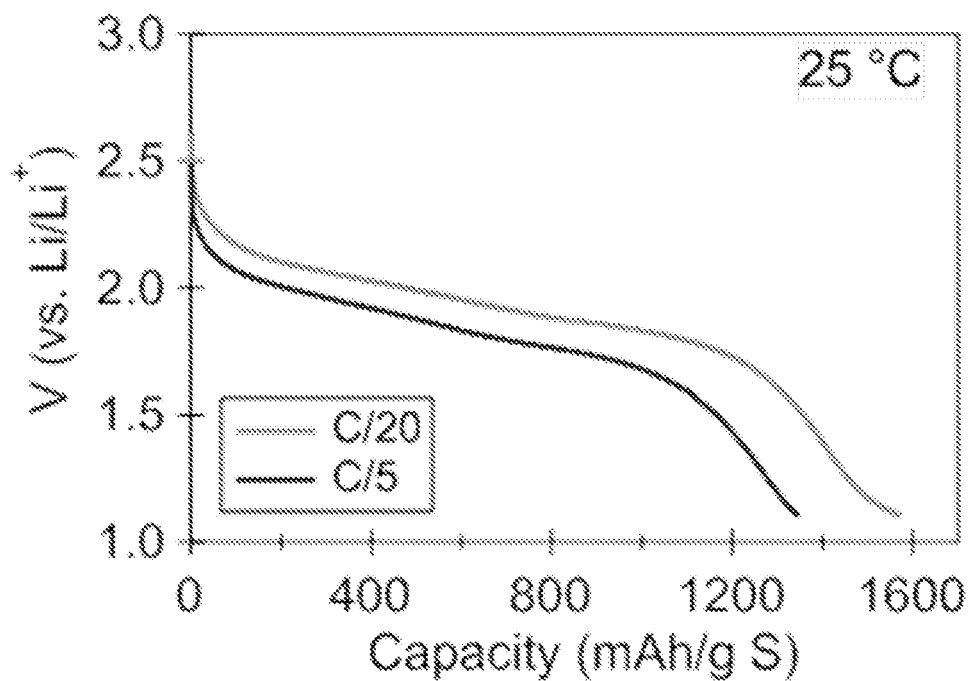
FIG. 10 shows a voltage profile of a solid-state sulfur cathode in a Li—In|Composite Electrolyte|Sulfur cell according to certain embodiments of the present invention at C/5 and C/20 discharge rates.
Figure 11:
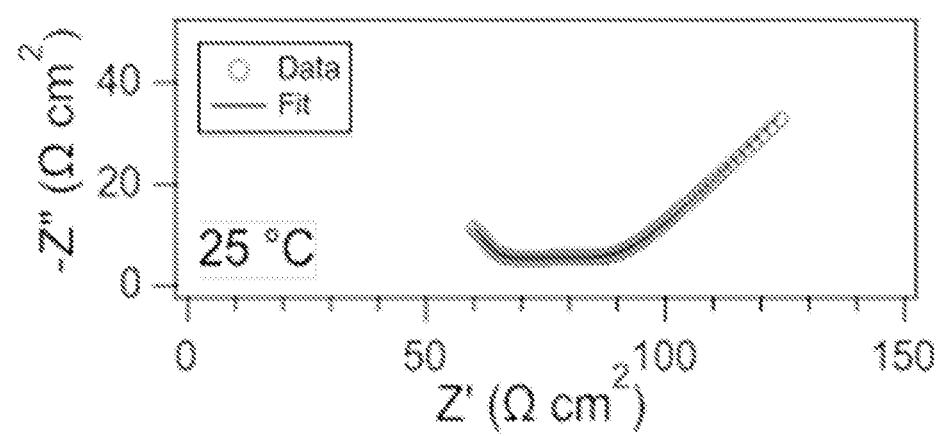
FIG. 11 shows an EIS spectrum of a Li—In|Composite Electrolyte|Sulfur cell according to certain embodiments of the present invention.

FIG. 10 shows a voltage profile of a solid-state sulfur cathode in a Li—In|Composite Electrolyte|Sulfur cell according to certain embodiments of the present invention at C/5 and C/20 discharge rates. The curve profiles indicate solid-state reactions, without soluble polysulfide intermediates. This permits nearly full utilization of the active material. FIG. 11 shows an EIS spectrum of a Li—In|Composite Electrolyte|Sulfur cell according to certain embodiments of the present invention. The plot shows low room-temperature impedance (less than $100\Omega$ cm$^2$). This indicates that there is intimate contact between the coated layers and low transfer resistance.

In the description above and in the claims, numerical ranges are inclusive of the end points of the range. For example, "an average diameter between 0.1 μm and 500 μm," includes 0.1 μm and 500 μm. Similarly, ranges represented by a dash (e.g., 50%-99%) are inclusive of the end points of the ranges.

The foregoing describes the instant invention and its certain embodiments. Numerous modifications and variations in the practice of this invention are expected to occur to those skilled in the art. For example, while the above specification describes electrolytes and cathodes for alkali ion or alkali metal batteries, the compositions described may be used in other contexts. Further, the batteries and battery components described herein are no limited to particular cell designs. Such modifications and variations are encompassed within the following claims.

The invention claimed is:

1. A solid-state electrode for use in an alkali ion or alkali metal battery, comprising:
   an inorganic phase comprising an ionically conductive inorganic material and an electrochemically active material; and
   an organic phase comprising a homogenous mixture of a first component and a binder, wherein the first component is a non-ionically conductive polymer having a number average molecular weight of between 500 g/mol and 50,000 g/mol and the binder is a non-ion conducting polymer having a number average molecular weight of at least 100 kg/mol.

2. The solid-state electrode of claim 1, wherein the ionically conductive inorganic material constitutes between 15% and 60% by weight of the inorganic phase, the electrochemically active material constitutes between 30% and 80% by weight of the inorganic phase, and the inorganic phase further comprises an electronically conductive additive that constitutes between 5% and 25% of the inorganic phase.

3. The solid-state electrode of claim 1, wherein the first component constitutes between 50% and 99% by weight of the organic phase, and the binder constitutes between 1% and 50% by weight of the organic phase.

4. The solid-state electrode of claim 1, wherein the first component is polydimethylsiloxane (PDMS), polybutadiene (PBD), polystyrene, a cyclic olefin polymer.

5. The solid-state electrode of claim 1, wherein the first component is a linear polymer having end groups selected from cyano, thiol, amide, amino, sulfonic acid, epoxy, carboxyl, or hydroxyl groups.

6. The solid-state electrode of claim 1, wherein the inorganic phase is dispersed in a matrix of the organic phase.

7. The solid-state electrode of claim 1, wherein the first component has a glass transition temperature (Tg) of less than −50° C.

8. The solid-state electrode of claim 7, wherein the binder has a glass transition temperature greater than 70° C.

9. The solid-state electrode of claim 1, wherein the inorganic phase constitutes at least 85% by weight of the solid-state electrode.

10. The solid-state electrode of claim 1, wherein the organic phase constitutes between 3% and 15% by weight of the solid-state electrode.

11. The solid-state electrode of claim 1, wherein the electrochemically active material is selected from the group consisting of lithium cobalt oxide (LCO), lithium manganese oxide (LMO), lithium nickel cobalt aluminum oxide (NCA), lithium iron phosphate (LFP) and lithium nickel cobalt manganese oxide (NCM).

12. The solid-state electrode of claim 1, wherein the electrochemically active material is selected from the group consisting of a carbon-containing material, a silicon-containing material, a tin-containing material, lithium, or a lithium alloyed metal.

13. The solid-state electrode of claim 1, wherein the first component and binder are soluble in a non-polar organic solvent.

14. The solid-state electrode of claim 1, wherein the electrochemically active material is a silicon-containing material.

15. A solid-state electrode for use in an alkali ion or alkali metal battery, comprising:
   an inorganic phase comprising an ionically conductive inorganic material and an electrochemically active material; and
   an organic phase comprising a first component and a binder, wherein the first component is a non-ionically-conductive polymer having a number average molecular weight of between 500 g/mol and 50,000 g/mol and the binder is a non-ion conducting polymer having a number average molecular weight of at least 100 kg/mol, and wherein the binder is soluble in a non-polar organic solvent.

16. The solid-state electrode of claim 15, wherein the non-polar organic solvent is p-xylene.

17. The solid-state electrode of claim 15, wherein the inorganic phase further comprises an electronically conductive additive.

18. The solid-state electrode of claim 17, wherein the ionically conductive inorganic material constitutes between 15% and 60% by weight of the inorganic phase, the electrochemically active material constitutes between 30% and 80% by weight of the inorganic phase, and the electronically conductive additive constitutes between 5% and 25% of the inorganic phase.

19. The solid-state electrode of claim 15, wherein the first component constitutes between 50% and 99% by weight of the organic phase, and the binder constitutes between 1% and 50% by weight of the organic phase.

20. The solid-state electrode of claim 15, wherein the electrochemically active material is a silicon-containing material.

* * * * *